United States Patent
Hamasuna et al.

(10) Patent No.: US 7,665,679 B2
(45) Date of Patent: Feb. 23, 2010

(54) DOCUMENT MANAGEMENT SYSTEM AND DOCUMENT DESTRUCTION APPARATUS

(75) Inventors: Shunsuke Hamasuna, Kanagawa (JP); Ryuuichi Shiraishi, Kanagawa (JP); Hiroyoshi Uejo, Kanagawa (JP); Kengo Shinozaki, Kanagawa (JP); Shusaku Kubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 306 days.

(21) Appl. No.: 11/404,804

(22) Filed: Apr. 17, 2006

(65) Prior Publication Data

US 2007/0080249 A1    Apr. 12, 2007

(30) Foreign Application Priority Data

Oct. 12, 2005  (JP)  ............................ P2005-297284
Oct. 12, 2005  (JP)  ............................ P2005-297285

(51) Int. Cl.
*B02C 25/00* (2006.01)
(52) U.S. Cl. ...................................... 241/36; 241/101.2
(58) Field of Classification Search .............. 241/101.2, 241/36, 236, 100; 235/375, 476; 358/1.14; 707/100, 204, 101
See application file for complete search history.

(56) References Cited

U.S. PATENT DOCUMENTS

| | | | |
|---|---|---|---|
| 5,467,169 A | | 11/1995 | Morikawa |
| 5,813,009 A | * | 9/1998 | Johnson et al. ............. 707/100 |
| 6,763,997 B2 | * | 7/2004 | Bennett et al. ............. 235/375 |
| 2003/0146275 A1 | | 8/2003 | Bennett et al. ............. 235/376 |
| 2006/0274352 A1 | | 12/2006 | Nakaguma et al. |
| 2006/0285147 A1 | | 12/2006 | Wolfman et al. ........... 358/1.14 |

FOREIGN PATENT DOCUMENTS

| | | |
|---|---|---|
| DE | 196 09 435 A1 | 9/1996 |
| EP | 0 447 581 A1 | 9/1991 |
| EP | 0 505 109 A1 | 9/1992 |
| EP | 1 462 988 A1 | 9/2004 |
| JP | 2000-42440 | 2/2000 |
| JP | 2003-62476 | 3/2003 |
| JP | 2005-190365 | 7/2005 |
| JP | 2005-262135 | 9/2005 |
| JP | 2006-102572 | 4/2006 |
| JP | 2007-4431 | 1/2007 |

* cited by examiner

*Primary Examiner*—Mark Rosenbaum
(74) *Attorney, Agent, or Firm*—Morgan, Lewis & Bockius LLP

(57) ABSTRACT

A document management system comprises a document management apparatus that manages a document ID by associating the document ID with a storage time of the document, and checks the storage time in response to an inquiry about a permission of destroying the document and gives a permission of destroying the document when the storage time has expired, and a document destruction apparatus including a mode selection unit that selects one of a first destruction mode and a second destruction mode and an execution unit that destroys the document according to a destruction mode selected by the mode selection unit. The execution unit destroys the document without reading the document ID in the first destruction mode, and reads the document ID to inquire the permission of destroying the and destroys the document when the document management apparatus gives the permission of destroying the document in the second destruction mode.

7 Claims, 24 Drawing Sheets

FIG. 8

| DOCUMENT ID | DOCUMENT CREATION DATE | DOCUMENT STORAGE TIME | DOCUMENT DESTRUCTION DATE |
|---|---|---|---|
| 0000000001 | 1998.5.31 14:00 | 2004.5.31 14:00 | 2004.6.15 11:32 |
| 0000000002 | 1998.6.12 10:30 | 2001.6.12 10:30 | 2001.6.30 16.09 |
| ⋮ | ⋮ | ⋮ | ⋮ |
| 0000012345 | 2000.10.20 9:55 | NON-DESIGNATED | 2000.8.26 10:38 |
| 0000012346 | 2000.10.25 8:55 | PERMANENT STORAGE | - |
| ⋮ | ⋮ | ⋮ | ⋮ |
| 0000123456 | 2002.8.15 13:46 | 2005.8.15 13:46 | UNDESTROYED |
| ⋮ | ⋮ | ⋮ | ⋮ |

FIG. 21

| DOCUMENT ID | DOCUMENT CREATION DATE | DOCUMENT STORAGE TIME | DOCUMENT DESTRUCTION DATE |
|---|---|---|---|
| 0000000001 | 1998.5.31 14:00 | 2004.5.31 14:00 | 2004.6.15 11:32 |
| 0000000002 | 1998.6.12 10:30 | 2001.6.12 10:30 | 2001.6.30 16.09 |
| ⋮ | ⋮ | ⋮ | ⋮ |
| 0000012345 | 2000.10.20 9:55 | NON-DESIGNATED | 2000.8.26 10:38 |
| 0000012346 | 2000.10.25 8:55 | PERMANENT STORAGE | - |
| ⋮ | ⋮ | ⋮ | ⋮ |
| 0000123456 | 2002.8.15 13:46 | 2005.8.15 13:46 | UNDESTROYED |
| ⋮ | ⋮ | ⋮ | ⋮ |

DOCUMENT MANAGEMENT SYSTEM AND DOCUMENT DESTRUCTION APPARATUS

BACKGROUND

1. Technical Field

The present invention relates to a document management system suitable for being applied to the management of documents, and also relates to a document destruction apparatus.

2. Related Art

Generally, confidential documents, such as documents intended for use only in a section or a company, are frequently handled in corporate offices and public institutions, such as a city office. Originals of such confidential documents are stored under strict control to prevent confidential information from being leaked. Further, confidential documents rendered unnecessary are destroyed by using a shredder or the like.

A storage times are designated for most of accounting documents, such as debit notes, receipts, and statements of account. Thus, in a case where confidential documents are destroyed by being shredded, it is necessary for a person in charge to check in advance according to an original ledger whether the confidential document to be destroyed can really be destroyed.

However, in the case of destroying a large amount of confidential documents, it is very troublesome and time-consuming to perform document destruction by checking the storage times of the confidential documents one by one. Additionally, there is a fear that a confidential document having a remaining storage time may be destroyed by mistake due to human error.

There is only one original of each confidential document. Thus, even when an image representing a confidential document is saved as electronic data, the original of each confidential document cannot be restored. Therefore, the troublesome checking operation at the destruction of a confidential document cannot be omitted. Also, occurrence of erroneous destruction of a confidential document due to human checking error cannot be prevented.

SUMMARY

One aspect of the invention may provide a document management system, including: a document management apparatus that manages a document ID by associating the document ID with a storage time of the document, and that checks the storage time of the document, in response to an inquiry about a permission of destroying the document having a designated document ID, and that gives a permission of destroying the document when the storage time thereof has expired; and a document destruction apparatus including a mode selection unit that selects one of a first destruction mode and a second destruction mode and an execution unit that destroys the document according to a destruction mode selected by the mode selection unit; the execution unit being configured to destroy the document without reading the document ID thereof in the first destruction mode; and in the second destruction mode, the execution unit being configured to read the document ID, to inquire the permission of destroying the document of the document management apparatus by designating the read document ID, and to destroy the document when the document management apparatus gives the permission of destroying the document.

Another aspect of the invention may provide a document destruction apparatus, including: a mode selection unit that selects one of a first destruction mode and a second destruction mode; and an execution unit that destroys the document according to a destruction mode selected by the mode selection unit; the execution unit being configured to destroy without reading the document ID thereof in the first destruction mode; and in the second destruction mode, the execution unit being configured to read the document ID, to inquire a permission of destroying the document of a document management apparatus while designating the read document ID, and to destroy the document when the document management apparatus gives the permission of destroying the document.

Another aspect of the invention may provide a document management system, including: a document management apparatus that manages a document ID by associating the document ID at least with a storage time of the document, and that checks the storage time of the document, in response to an inquiry about a permission of destroying the document having a designated ID, and that gives a permission of destroying the document when the storage time thereof has expired; and a document destruction apparatus that reads the document ID to inquire the permission of destroying the document of the document management apparatus by designating the read document ID, and that destroys the document when the document management apparatus gives the permission of destroying the document; the document destruction apparatus including an apparatus body having a shredder portion that performs document destruction, and a scanning unit detachably loaded in the apparatus body; and the scanning unit including a reading portion that reads the document ID from the document.

Another aspect of the invention may provide a document destruction apparatus, including: an apparatus body having a shredder portion that performs document destruction; and a scanning unit detachably loaded in the apparatus body, the scanning unit including a reading portion that reads a document ID from a document; the document destruction apparatus inquiring a permission of destroying the document of a document management apparatus by designating the document ID read by the scanning unit and destroying the document by the shredder portion when the document management apparatus gives the permission of destroying the document.

BRIEF DESCRIPTION OF THE DRAWINGS

Embodiment may be described in detail with reference to the accompanying drawings, in which:

FIG. 8 is a diagram illustrating an example of a document management table.

FIG. 21 is a diagram illustrating an example of a document management table.

DETAILED DESCRIPTION

FIRST EMBODIMENT

Hereinafter, a first embodiment is described in detail by referring to the accompanying drawings.

Figure 1:
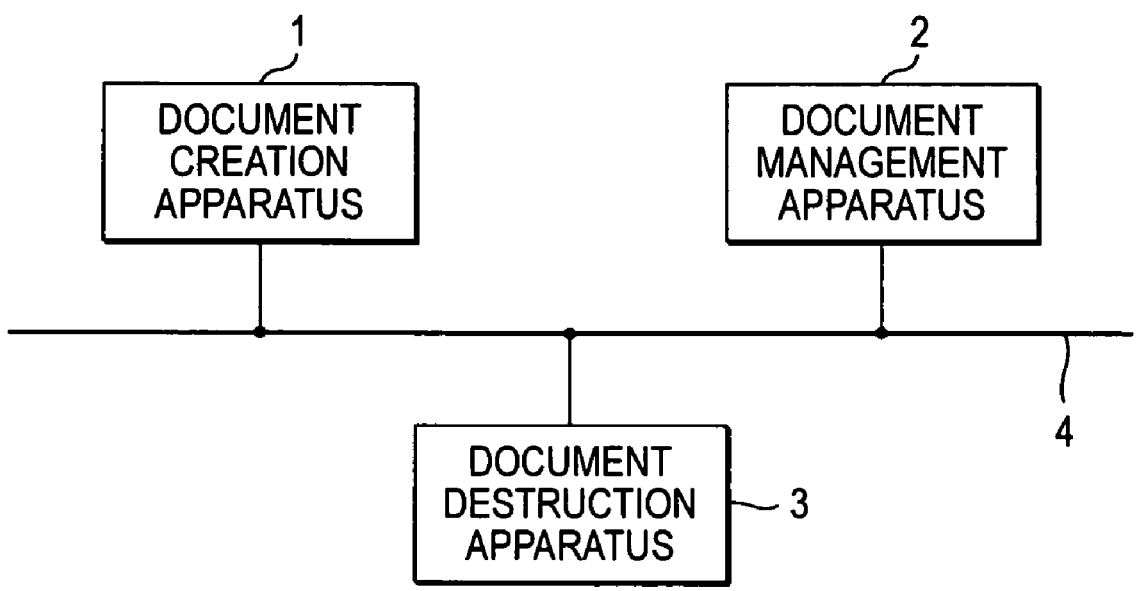
FIG. 1 is a diagram illustrating the configuration of a document management system according to an embodiment of the invention.

FIG. 1 is a diagram illustrating the configuration of a document management system according to an embodiment of the invention. The illustrated document management system includes a document creation apparatus 1, a document management apparatus 2, and a document destruction apparatus 3. The document creation apparatus 1, the document management apparatus 2, and the document destruction apparatus 3 are connected to a common network 4.

The document creation apparatus 1 is configured to create a document (a paper document) to which a document ID is added. The document management apparatus 2 is configured to perform various management processes on the document created by the document creation apparatus 1. The document destruction apparatus 3 is configured to perform the destruction of the document created by the document creation apparatus 1 and other documents. The network 4 is constituted by using, for example, a LAN (Local Area Network) or a WAN (Wide Area Network).

Figure 2:
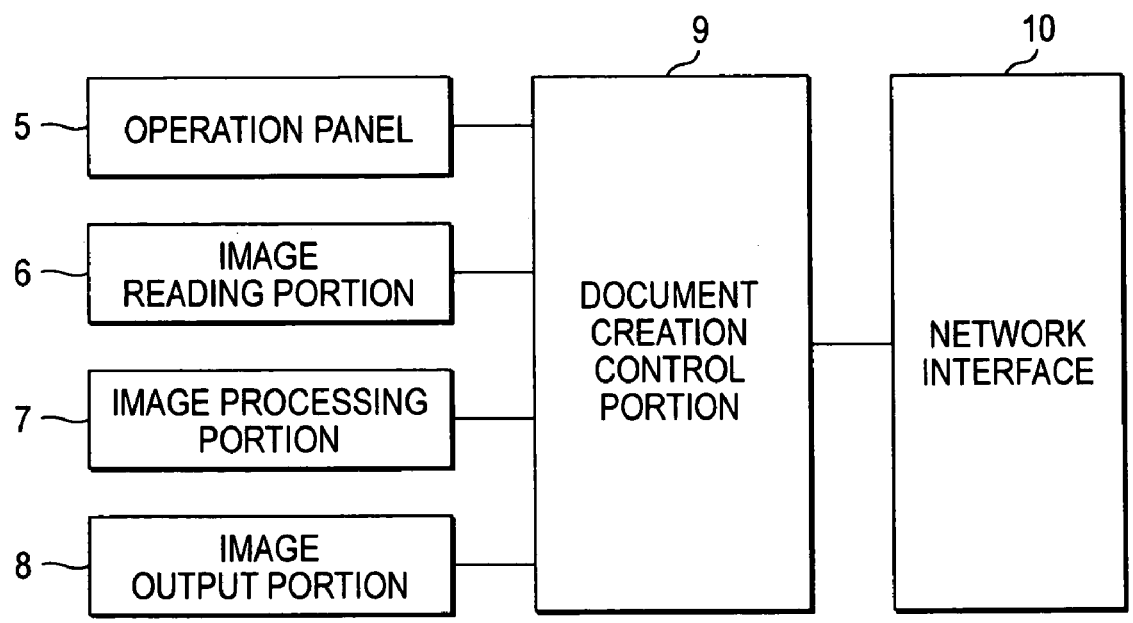
FIG. 2 is a block diagram illustrating an example of the configuration of a document creation apparatus.

FIG. 2 is a block diagram illustrating an example of the configuration of the document creation apparatus 1. The document creation apparatus 1 is constituted by using, for example, a digital copier, a digital composite machine (a multifunctional copier), or the like. The document creation apparatus 1 is constituted by using an operation panel 5, an image reading portion 6, an image processing portion 7, an image output portion 8, a document creation control portion 9, and a network interface 10.

The operation panel 5 serves as a user interface through which a user using the document creation apparatus 1 inputs various information and which diverse information is displayed to users. The operation panel 5 includes an input portion, which has, for instance, various buttons, switches, and keys, and a display portion including a liquid display device with a touch panel.

The image reading portion 6 is adapted to optically read an original image to be read. The image reading portion 6 is configured so that light is irradiated onto a surface of an original set on a transparent original table (a platen glass), that reflection light coming from the surface of the original is read through an imaging optical system including a mirror and a lens, and that an image is formed on a light receiving surface of a reading sensor, such as a CCD sensor, thereby to generate image data (scan data) corresponding to an image of an original. At that time, a surface of the original is read and scanned by movement of the imaging optical system.

The image processing portion 7 performs predetermined image processing (for example, color conversion, color correction, tone correction, scaling, image rotation, or screen generation) on the image data representing the original read by the image reading portion 6.

The image output portion 8 outputs the image data, which has been read by the image reading portion 6 and has undergone the image processing at the image processing portion 7, by printing the image data on a recording medium, such as a sheet of paper. The image output portion 8 prints the image data according to, for example, an electrophotographic method.

The document creation control portion 9 controls various processing operations relating to the document creation. The document creation control portion 9 controls processing operations of the operation panel 5, the image reading portion 6, the image processing portion 7, and the image output portion 8 according to a preliminarily installed control program.

The network interface 10 is a communication interface through which the document creation apparatus 1 transmits and receives data to and from other apparatuses, which include the document management apparatus 2 and the document destruction apparatus 3, on the network 4. The data transmission and reception using the network interface 10 are controlled by the document creation control portion 9.

Figure 3:
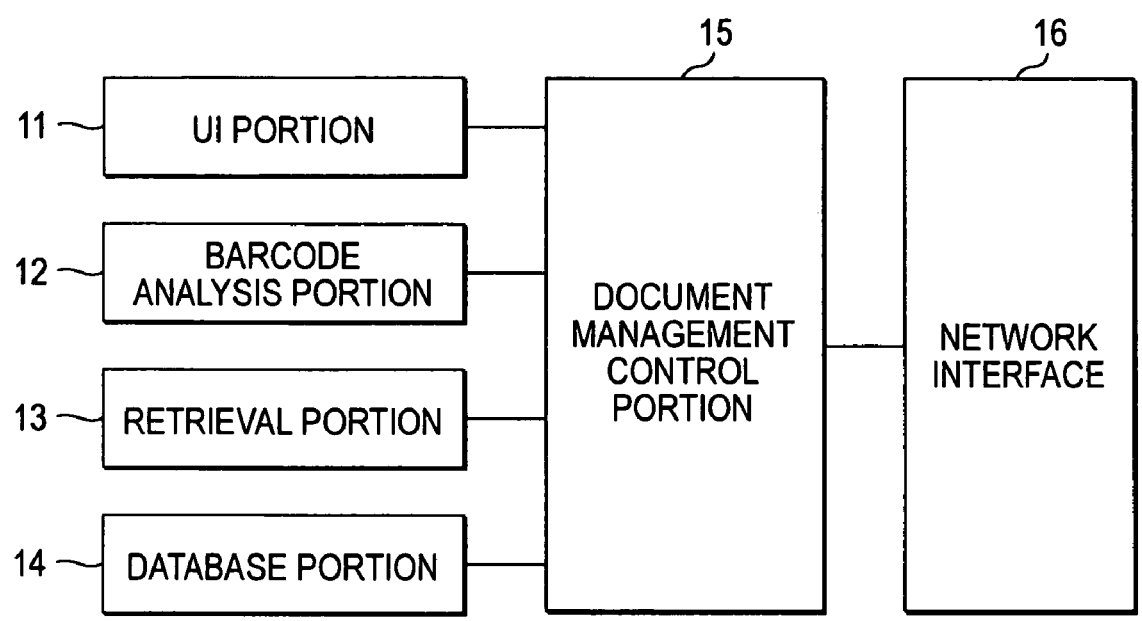
FIG. 3 is a block diagram illustrating an example of the configuration of a document management apparatus.

FIG. 3 is a block diagram illustrating an example of the configuration of the document management apparatus 2. The document management apparatus 2 is constituted by using, for example, a personal computer. The document management apparatus 2 is also constituted by using a user interface portion (a UI portion) 11, a barcode analysis portion 12, a retrieval portion 13, a database portion 14, a document management control portion 15, and a network interface 16.

The user interface portion 11 serves as a user interface through the through which a user using the document management apparatus 2 inputs various information and which diverse information is displayed to users. The user interface portion 11 includes an input device, such as a keyboard, and a mouse, and also includes a display device, such as a liquid display device.

The barcode analysis portion 12 analyzes a barcode included in image data (scan data) and performs decoding processing thereon. The barcode to be analyzed by the barcode analysis portion 12 is included in image data obtained when the image of a document with a barcode is read by the document creation apparatus 1. This barcode represents information including at least a document ID. Generally, barcodes are roughly classified into a class of one-dimensional barcodes, whose bars arranged only in one direction represent information, and that of two-dimensional barcodes whose bars arranged in two directions represent information. Both classes of barcodes can be utilized when the invention is implemented.

Incidentally, in a case where one barcode includes various information and data in addition to the document ID, it is advisable to use a two-dimensional barcode having larger data capacity, as compared with a one-dimensional barcode. In the present embodiment, it is assumed that a QR-code (registered trademark), which is a kind of a two-dimensional barcode and is in widespread use, is used as an example.

The retrieval portion 13 performs the retrieval of data stored in the database portion 14. The database portion 14 stores various data. The database portion 14 is constituted by using, for example, a hard disk drive.

The document management control portion 15 controls various processing operations relating to document management. The document management control portion 15 controls processing operations of the user interface portion 11, the barcode analysis portion 12, the retrieval portion 13 and the database portion 14 according to a preliminarily installed control program.

The network interface 16 is a communication interface through which data transmission and reception to and from other apparatuses (including the document creation apparatus 1 and the document destruction apparatus 3) on the network 4 are performed. The data transmission and reception using the network interface 16 are controlled by the document management control portion 15.

Figure 4:
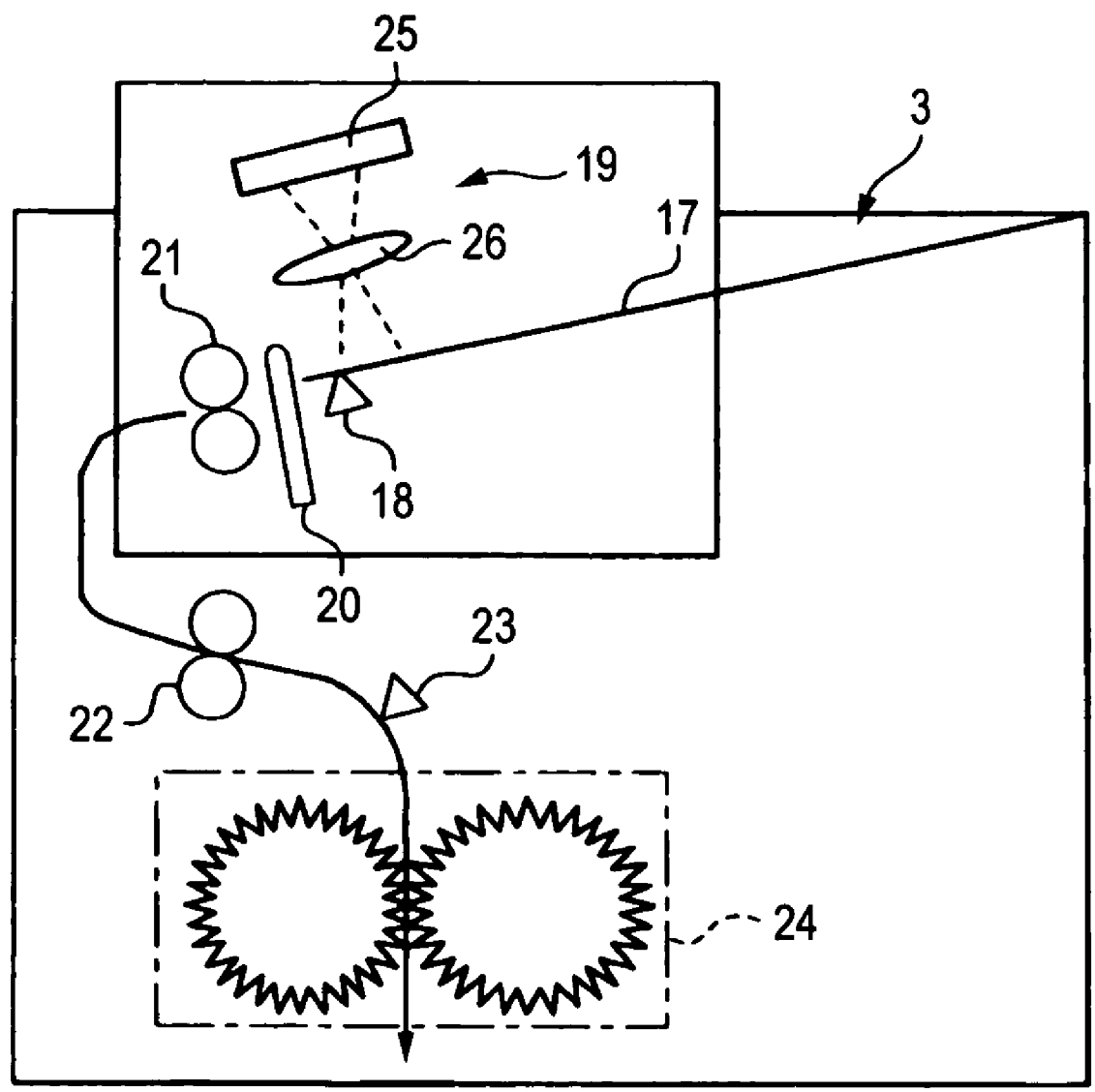
FIG. 4 is a schematic diagram illustrating an example of the mechanism of a document destruction apparatus.

FIG. 4 is a schematic diagram illustrating an example of the mechanism of the document destruction apparatus 3. The document destruction apparatus 3 is constituted by using, for instance, a shredder. The document destruction apparatus 3 includes a document tray portion 17, an insertion sensor 18, a reading optical system 19 of a barcode reader, a stopper gate 20, feed rolls 21 and 22, a pass sensor 23, and a shredder portion 24.

The document tray portion 17 serves as a part on which a document to be destroyed is placed. The document tray portion 17 is formed to be inclined to a horizontal plane and to become gradually lowered toward the stopper gate 20. An inner side (a lower side) of the document tray portion 17, together with the insertion sensor 18, the reading optical system 19, the stopper gate 20, and the feed roll 21, are covered with a cover member (not shown).

The insertion sensor 18 serves to detect that a document is inserted to a reading position in the document tray portion 17. The insertion sensor 18 is constituted by, for example, an optical sensor of the reflection type having a light emitting device and a light receiving device, and is put into an on-state when a document is present at a sensing position, and is brought into an off-state when no document is present at the sensing position.

The reading optical system 19 of the barcode reader receives reflection light, which is obtained by reflecting light irradiated from a light source (not shown) onto a barcode recording part of the document to be destroyed, at an area sensor 25 through a lens 26 to thereby provide an image of the barcode into the area sensor 25. The barcode recording part is a part of a surface of a document, on which a barcode representing information including a document ID is recorded. The position (or region) and the size of the barcode recording part is preliminarily determined at a corner portion of the document.

The stopper gate 20 has an elongated-plate-like structure, and is provided between the insertion sensor 18 and the feed roll 21. The stopper gate 20 is provided at an entrance part of a document conveying path formed by the feed rolls 21 and 22. The stopper gate 20 serves to open and close the entrance of the document conveying path. In a state in which the stopper gate 20 is closed, the stopper gate 20 is disposed to project to the path to shut off the document path extending from the document tray portion 17 to the feed roll 21. Thus, when the document put on the document tray portion 17 is inserted into an inner side thereof, an end of the document abuts against the stopper gate 20. In contrast, in a state in which the stopper gate 20 is opened, the stopper gate 20 moves back from the document path extending from the document tray 17 to the feed roll 21, and is disposed to be retreated from the path. Thus, when the document placed on the document tray portion 17 is inserted into an inner side thereof, an end of the document abuts against a nip part of the feed roll 21.

Figure 5:
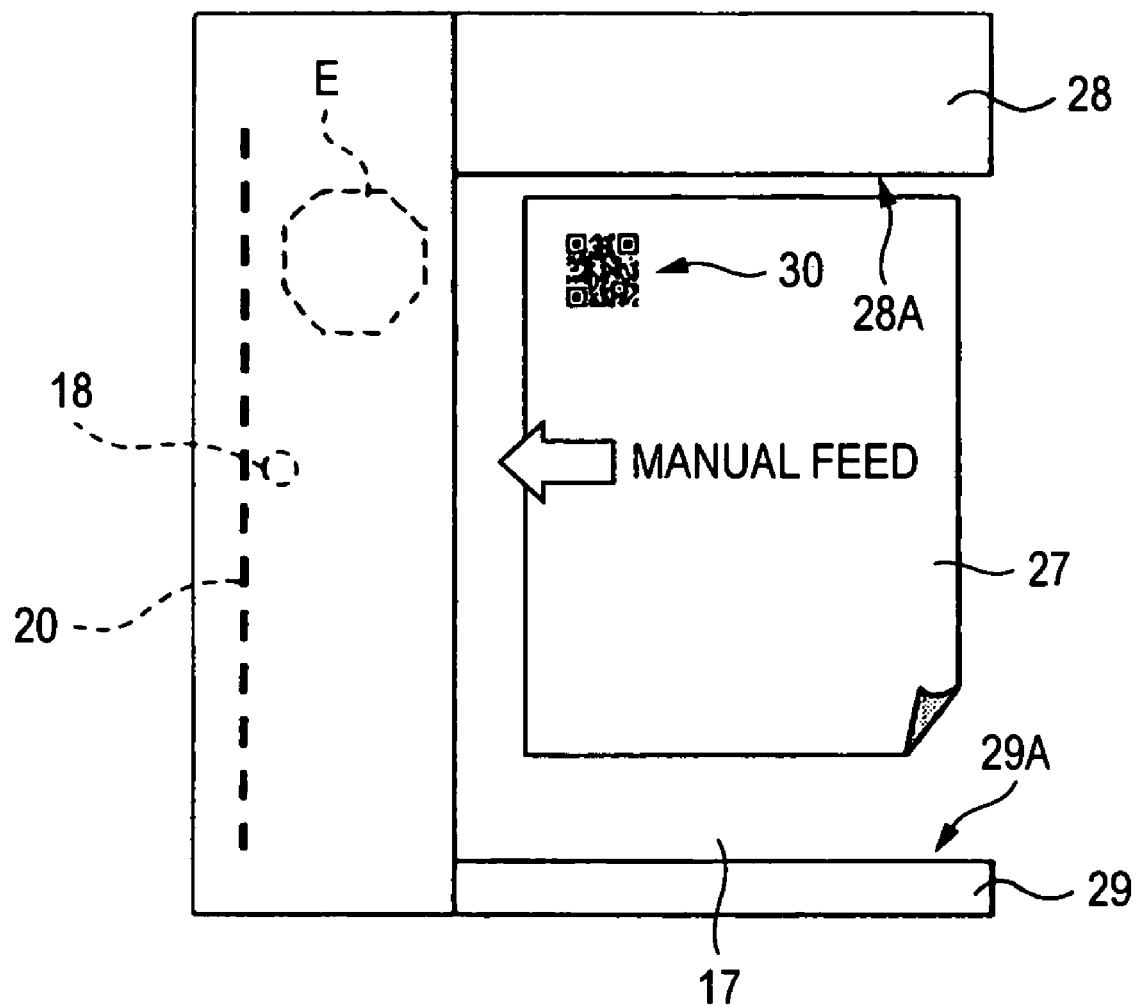
FIG. 5 is a diagram illustrating a document tray portion, which is taken from above.

FIG. 5 is a diagram illustrating the document tray portion 17, which is taken from above. Insertion guides 28 and 29 are provided on both sides in an insertion direction (the direction of an arrow), in which the document 27 is manually inserted, of the document tray portion 17. The insertion guides 28 and 29 have guide faces 28A and 29A, each of which is parallel to the insertion direction of the document, respectively. Between the insertion guides, the insertion guide 28 is provided in a fixed state. However, the insertion guide 29 is provided movably in the direction of width of the document (an up-down direction, as viewed in FIG. 5) according to need. The document 27 to be destroyed is inserted in the direction of the arrow into the document tray portion 17 in an orientation in which the barcode recording part 30 is placed at a leading-end-side corner portion thereof. At that time, to position the document 27 in a direction perpendicular to the insertion direction, one side edge of the document 27 is made to abut against and move along the guide face 28A of the insertion guide 28.

Consequently, in a state in which the document 27 is manually fed by the user so that the end thereof abuts against the stopper gate 20, the barcode recording part 30 is positioned in a code reading area E in which a barcode is read by the barcode reader. Also, the insertion sensor 18 is placed just short of the stopper gate 20. Thus, when an end of the document 27 manually fed by the user abuts against the stopper gate 20, the state of the insertion sensor 18 is changed from an off-state to an on-state just before the end of the document 27 abuts against the stopper gate 20. Consequently, timing, with which the insertion sensor 18 is turned on, indicates that with which the barcode recording portion 30 of the document 27 is placed in the code reading area E.

The feed roll 21 rotates while nipping the document inserted by opening the stopper gate 20. Thus, the document is conveyed along the document conveying path. The document conveying path is formed by using a conveying guide member (not shown), such as a chute. The feed roll 22 rotates while nipping the document conveyed by the feed roll 21. Thus, the document is conveyed to the shredder portion 24 along the document conveying path.

The pass sensor 23 is adapted to detect the passage of a document halfway (nearly at the midpoint of) the document conveying path extending from the feed roll 22 to the shredder portion 24. The pass sensor 23 is constituted by, for example, an optical sensor of the reflection type having a light emitting device and a light receiving device. When a document is present at a sensing position, the pass sensor 23 is in an on-state. When a document is absent at the sensing position, the pass sensor 23 is in an off-state. Therefore, when a leading end of the document passes through the sensing position of the pass sensor 23, the state of the pass sensor 23 is simultaneously changed to the off-state to the on-state. Subsequently, when a rear end of the document passes through the sensing position of the pass sensor 23, the state of the pass sensor 23 is simultaneously changed to the on-state to the off-state.

The shredder portion 24 shreds a document fed thereto by the feed roll 22 while drawing the document thereinto in one direction (the direction of an arrow). The shredder portion 24 can collectively shred a multiple-sheet document (for example, a bundle of about 20 sheets of A4-size plain paper). The shredder portion 24 can shred a document, whose sheets are stapled with a staple, without change (that is, without removing the staple).

Figure 6:
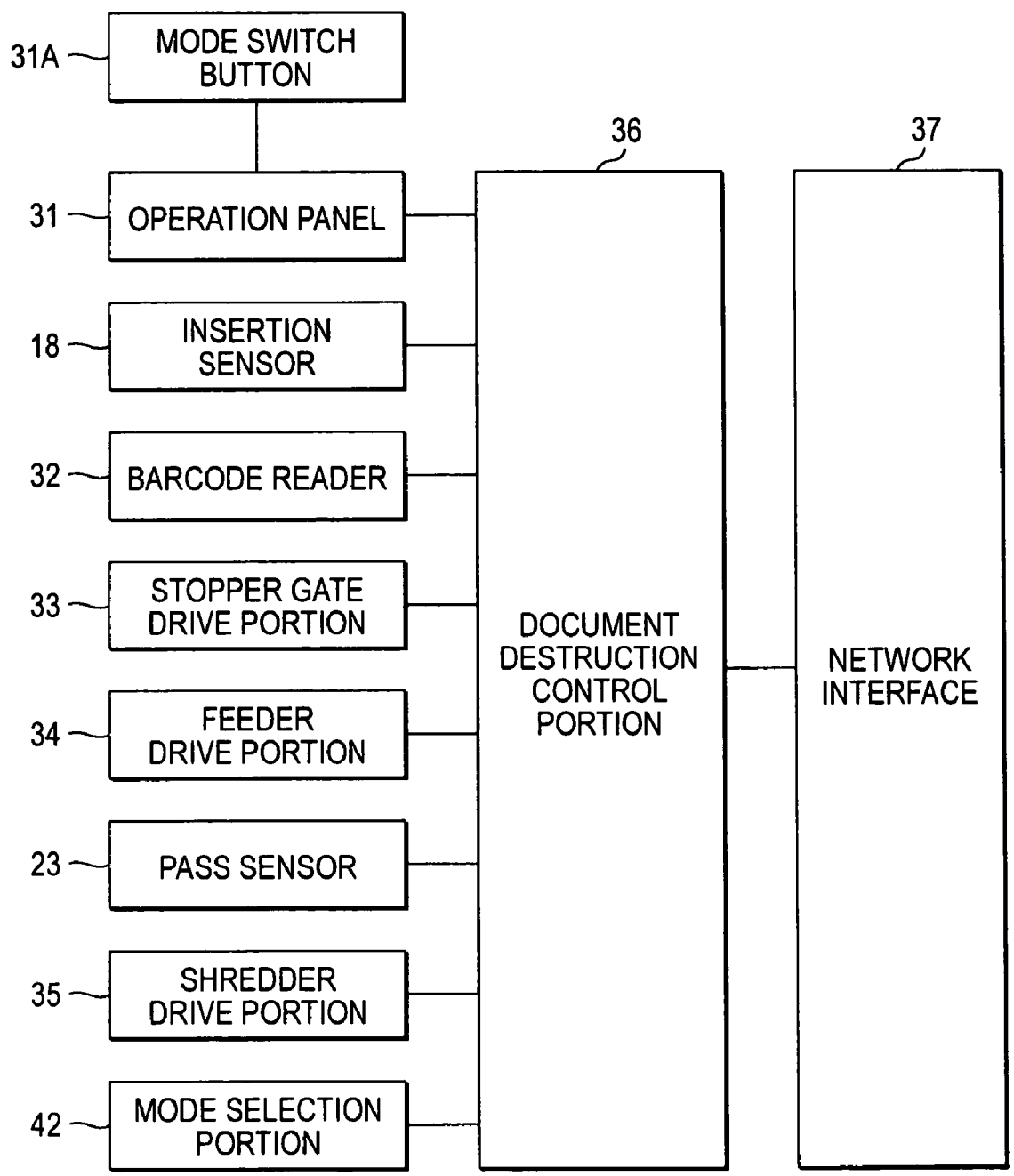
FIG. 6 is a block diagram illustrating an example of the configuration of a document destruction apparatus.

FIG. 6 is a block diagram illustrating an example of the configuration of the document destruction apparatus 3. The document destruction apparatus 3 includes an operation panel 31, a barcode reader 32, a stopper gate drive portion 33, a feeder drive portion 34, a shredder drive portion 35, a mode selection portion 42, a document destruction control portion 36, and a network interface 37, in addition to the aforementioned components.

The operation panel 31 is operated by a user who uses the document destruction apparatus 3. The operation panel 31 is constituted by using, for instance, operating buttons (for example, a start button, and a stop button) and a display panel on which various kinds of messages including guidance on the operating states and the operations of the document destruction apparatus 3 (guide messages) are displayed. The operation panel 31 has a mode switch button 31A serving as an operating button. The mode switch button 31A is used to designate the switching of the destruction mode, which is performed in the document destruction apparatus 3.

The barcode reader 32 optically reads a barcode, which is added to a document by printing, through the use of the reading optical system 19. According to a result of reading, the barcode reader 32 outputs information (or data) originally included in the barcode in the document.

The stopper gate drive portion 33 causes the aforementioned stopper gate 20 to perform an opening operation and a closing operation (that is, to protrude and recede). The stopper gate drive portion 33 can be constituted by using, for example, an electromagnetic plunger as a driving force source.

The feeder drive portion 34 causes the aforementioned feed rolls 21 and 22 to perform rotation operations. The feeder drive portion 34 can be constituted by using a motor as a driving force source.

The shredder drive portion 35 rotate-drives the aforementioned shredder portion 24. The shredder drive portion 35 can be constituted by using a motor as a driving force source.

The mode selection portion 42 selects one of the two destruction modes that the document destruction apparatus 3 has. Between the two destruction modes that the document destruction apparatus 3 has, a first destruction mode is a mode in which document destruction is performed without reading the document ID of a document to be destroyed. A second destruction mode is a mode in which the document ID of a document to be destroyed is read and in which the document destruction apparatus makes an inquiry to the document management apparatus 2 about whether destruction of the document designated by the read document ID is permitted, and in which the document destruction apparatus performs document destruction in a case where the document management apparatus 2 permits the document destruction.

The document destruction control portion 36 controls various processing operations, which relate to the document destruction, according to a predetermined control program. The document destruction control portion 36 performs document destruction according to the destruction mode selected by the mode selection portion 42. The operation panel 31, the barcode reader 32, the stopper gate drive portion 33, the feeder drive portion 34, and the shredder drive portion 35, the operations of which are controlled, are electrically connected to the document destruction control portion 36. Also, the insertion sensor 18 and the pass sensor 23, together with the mode selection portion 42, are electrically connected to the document destruction control portion 36.

The network interface 37 is a communication interface through which the document destruction apparatus 3 transmits and receives data to and from other apparatuses (including the document creation apparatus 1 and the document management apparatus 2) on the network 4. The data transmission and reception using the network interface 37 are controlled by the document destruction control portion 36.

Subsequently, a document management method using the document management system of the aforementioned configuration is described below. First, documents treated by the system according to the invention are created by the document creation apparatus 1 by assigning a unique document ID to each of the documents. The document ID may be constituted by either only numerals or an appropriate combination of alphanumeric characters and symbols. Hereinafter, a practical document management method in the case of treating documents, which are used as exhibits at an account audit and a tax inspection, is described.

Figure 7A:
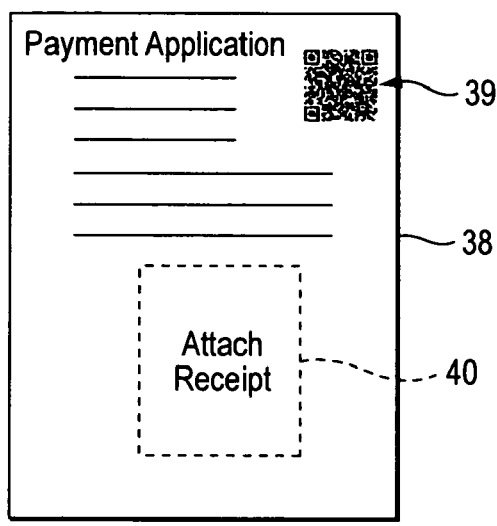
FIGS. 7A and 7B are explanatory diagrams each illustrating an example of the creation of a document.

First, document data (electronic data) representing a template for a document with a barcode is inputted to the document creation apparatus 1. The document data is outputted at the image output portion 8 by being printed on a sheet of paper. Thus, as illustrated in FIG. 7A, a mount corresponding to a payment application 38 is created. The document data may be generated by, for instance, the document management apparatus 2. Then, the generated document data may be inputted to the document creation apparatus 1 through the network 4 from the document management apparatus 2. Alternatively, the document data may be generated by a server apparatus used to document data. Then, the generated document data may be inputted to the document creation apparatus 1 through the network from the server apparatus.

Figure 7B:
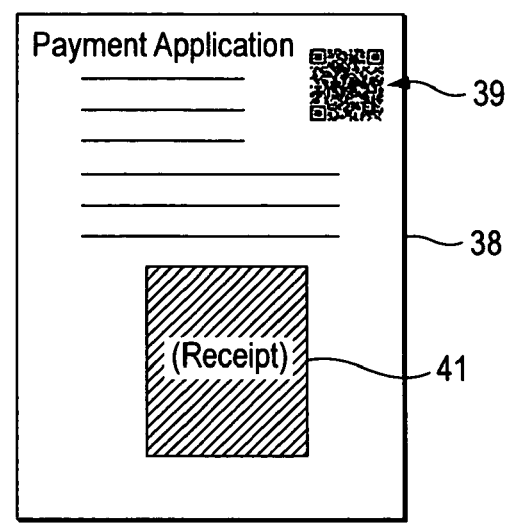

A QR-code 39 including a document ID assigned to a payment application 38 as a piece of information is added to a corner portion of the payment application 38, which is created by the document creation apparatus 1, by printing. That is, the payment application 38 created by the document creation apparatus 1 corresponds to a "document to which a document ID is added". A region 40, on which a receipt is mounted, is provided in the mount corresponding to the payment application 38. Thus, as illustrated in FIG. 7B, a receipt 41 is attached onto the mount corresponding to the payment application 38. According to need, an applicant performs a retouch and apposition of a seal (or impression of a seal) thereon. Thus, an original of the payment application 38 is created.

Upon completion of creating the payment application 38, the created payment application 38 is set on the original table of the document creation apparatus 1. Then, an image of the payment application 38 is read by the image reading portion 6. Alternatively, creation information is sent from the document creation apparatus 1 to the document management apparatus 2 through the network 4, so that the creation information is registered in the apparatus 2 as data. Then, image data representing the payment application 38, which is read by the image reading portion, is transmitted to the document management apparatus 2 through the network 4. Upon completion of reading, the original of the payment application 38 is stored in a file or the like.

On the other hand, the document management apparatus 2 having received the image data (or scan data) representing the payment application 38 from the document creation apparatus 1 causes the database portion 14 to store the image data. Also, an image representing the QR-code included in the image data is analyzed by the barcode analysis portion 12. Thus, decode information representing the document ID assigned to the payment application 38 is obtained. Then, the obtained document ID is registered in the document management table by the document management control portion 15. The document management table is created in the database portion 14.

FIG. 8 is a diagram illustrating an example of the document management table. As illustrated in this figure, the document ID, the document creation date and time, the document storage time, and the document destruction date and time are registered in the document management table by being associated with one another. In the case of registering the document creation date and time and the document destruction date and time, it is preferable to use a standard time obtained from a time distribution server or a time authentication server. Data obtained by decoding the QR-code in the barcode analysis portion 12 may be registered as the document ID. Alternatively, data assigned to the aforementioned document with the barcode by the document management apparatus itself 2 or another server apparatus when the document management apparatus 2 or the latter server apparatus generates such document data. The document creation data and time indicates a date and time, at which the document is created. According to the present embodiment, a date and time, at which the document creation apparatus 1 transmits the image data read from the document, such as the payment application 38, to the document management apparatus 2, or a date and time, at which the image data transmitted from the document creation apparatus 1 is received by the document management apparatus 2, is assumed to be registered as the "document creation date and time".

The document storage time indicates the date and time representing the document storage time. It is necessary to store the document, whose document ID is registered in the document management table, until the document storage time expires. Incidentally, in a case where the document storage time is registered as being "permanent", the document can be destroyed at any time. In a case where the document storage time is registered as being "non-designated", the document cannot be destroyed at all times.

Generally, the storage time of a receipt is determined according to a received amount of money. Thus, in a case where information for setting the document storage time is included in, for instance, the QR-code printed on the payment application 38 in addition to information representing the document ID, the document storage time can automatically be set from the decode information obtained by the barcode analysis portion 12. Practically, the date and time corresponding to 6 years reckoned from the date and time, at which the payment application 38 is created, can be set as the document storage time by causing the QR-code to include information designating 6 years as the document storage time of the payment application 38. Another way is that the QR-code is caused to include information representing the received amount of money described in the receipt that is attached to the payment application 38. Thus, the storage time of the receipt is automatically calculated from this information and can be set in the document management table as the document storage time. Additionally, a user can set or change the document storage time in the document management table by performing a manual input (operation) and using the user interface portion 11 of the document management apparatus 2.

The document destruction date and time indicates a date and time at which a document is destroyed. The destruction of the document is performed by the document destruction apparatus 3. Thus, a date and time, at which the document destruction apparatus 3 sends to the document management apparatus 2 a notification (hereunder referred to also as a "destruction completion notification") indicating that destruction of the document, whose document ID is designated, is completed, is registered in the document management table as the document destruction date and time.

Incidentally, the system may be configured so that a user ID of a user having created a document by using the document creation apparatus 1 is registered in the document management table as data indicating a document creator, and that a user ID of a user having destroyed a document by using the document destruction apparatus 3 is registered in the document management table as data indicating a document destroyer. In this case, ID information on a user having created or destroyed a document can be obtained by utilizing existing user authentication techniques (for example, the user authentication technique using an IC card).

Figure 9:
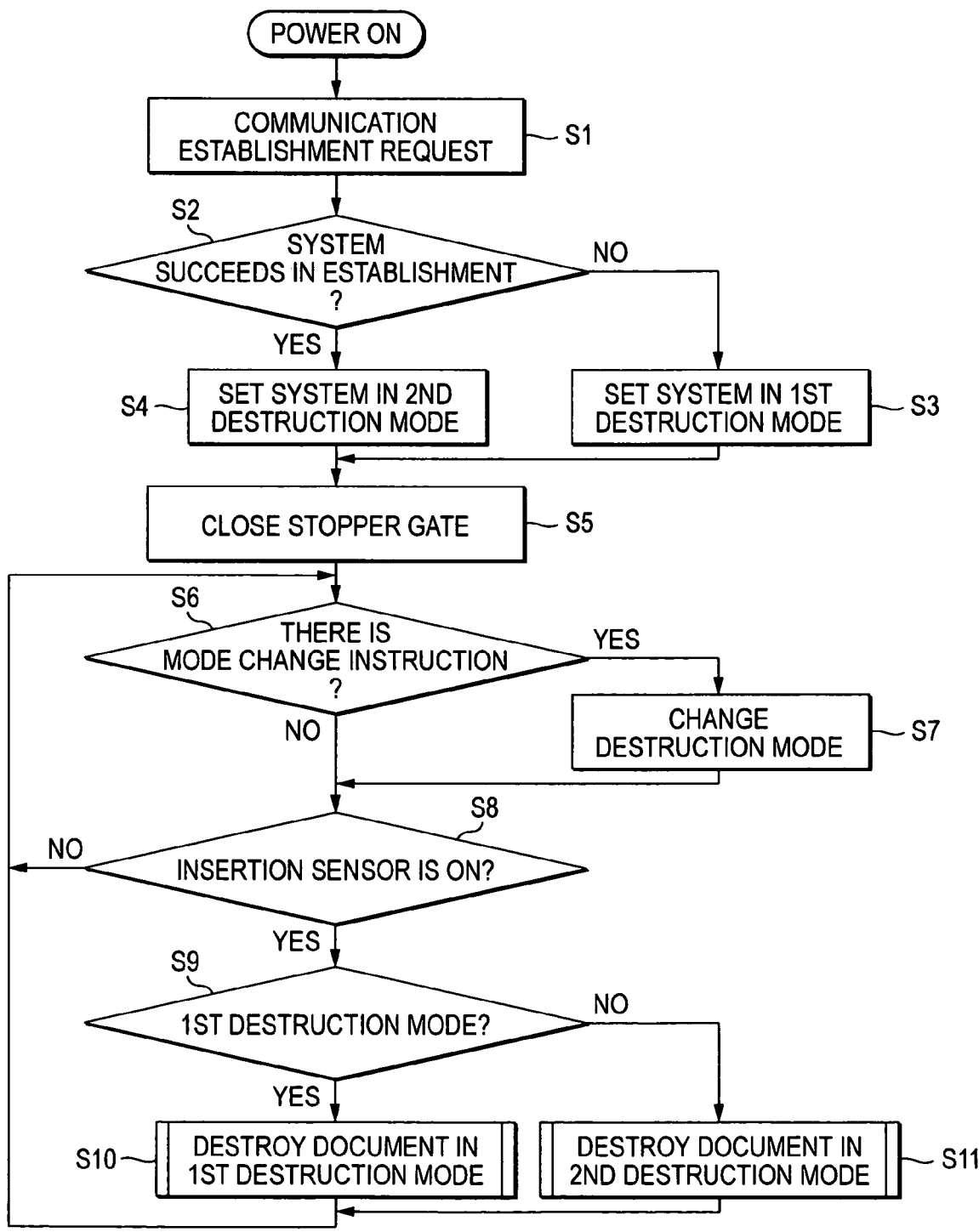
FIG. 9 is a flowchart illustrating a procedure for processing performed in the document destruction apparatus.

FIG. 9 is a flowchart illustrating a procedure for processing performed in the document destruction apparatus 3. First, the document destruction apparatus 3 is powered on. Then, the network interface 37 makes a communication establishment request to the document management apparatus 2 according to a control instruction from the document destruction control portion 36 in step S1. At that time, in a case where the communication establishment request sent from the document destruction apparatus 3 is normally received by the document management apparatus 2 through the network 4, a communication connection is established between the document management apparatus 2 and the document destruction apparatus 3. In a case where a communication establishment request is not normally received by the document management apparatus 2 due to some cause (for example, disconnections from or troubles caused on the network 4, and the power-off and the system-failure of the document management apparatus 2), the communication connection is not established between the document management apparatus 2 and the document destruction apparatus 3.

Subsequently, the document destruction control portion 36 determines in step S2 whether the document destruction apparatus 3 succeeds in establishing the communication between the document management apparatus 2 and the document destruction apparatus 3. If the apparatus 3 fails to establish the communication therebetween, the mode selection portion 42 sets the first destruction mode as the document destruction mode in step S3. If the apparatus 3 succeeds in establishing the communication therebetween, the mode selection portion 42 sets the second destruction mode as the document destruction mode in step S4. Subsequently, the document destruction control portion 36 drives the stopper gate drive portion 33 and closes the stopper gate 20 in step S5.

Subsequently, the document destruction control portion 36 determines in step S6 whether the mode switch button 31A is pushed by a user (that is, whether it is instructed to change the destruction mode). If the mode switch button 31A is pushed (that is, it is instructed to change the destruction mode), the set destruction mode is changed in step S7 according to the determination. That is, in a case where the first destruction mode is set as the destruction mode before the mode switch button 31A is pushed, the set destruction mode is changed from the first destruction mode to the second destruction mode. Conversely, in a case where the second destruction mode is set as the destruction mode before the mode switch button 31A is pushed, the set destruction mode is changed from the second destruction mode to the first destruction mode.

In contrast, if the mode switch button 31A is not pushed, the control portion 36 determines in step S8 whether a signal representing an on/off-state of the insertion sensor 18 represents an on-state. Incidentally, a user using the document destruction apparatus 3 inserts a document, which is to be destroyed, by being put on the document tray portion 17. Additionally, in a case where a QR-code is printed on the document to be destroyed, the document is inserted in an orientation so that a surface, on which the QR-code is printed, is the topmost surface (that is, in the upward orientation), and that the part of the surface, on which the QR-code is printed, is placed at a downstream side (an inner side). Then, the state of the signal from the insertion sensor 18 is changed from the off-state to the on-state just before the leading end of the document abuts against the stopper gate 20. Thus, if the signal from the insertion sensor 18 is in the off-state, the document destruction control portion 36 returns to step S6. If the signal from the insertion sensor 18 is in the on-state, the document destruction control portion 36 determines in step S9 whether a current destruction mode selected (or set) by the mode selection portion 42 is the first destruction mode.

Then, if the current destruction mode is set to be the first destruction mode, the document destruction control portion 36 performs the destruction of the document according to the first destruction mode in step S10. Subsequently, the document destruction control portion 36 returns to step S6. In a case where the current destruction mode is set to be the second destruction mode, the document destruction control portion 36 performs the destruction of the document according to the second destruction mode in step S1. Subsequently, the document destruction control portion 36 returns to step S6.

Figure 10:
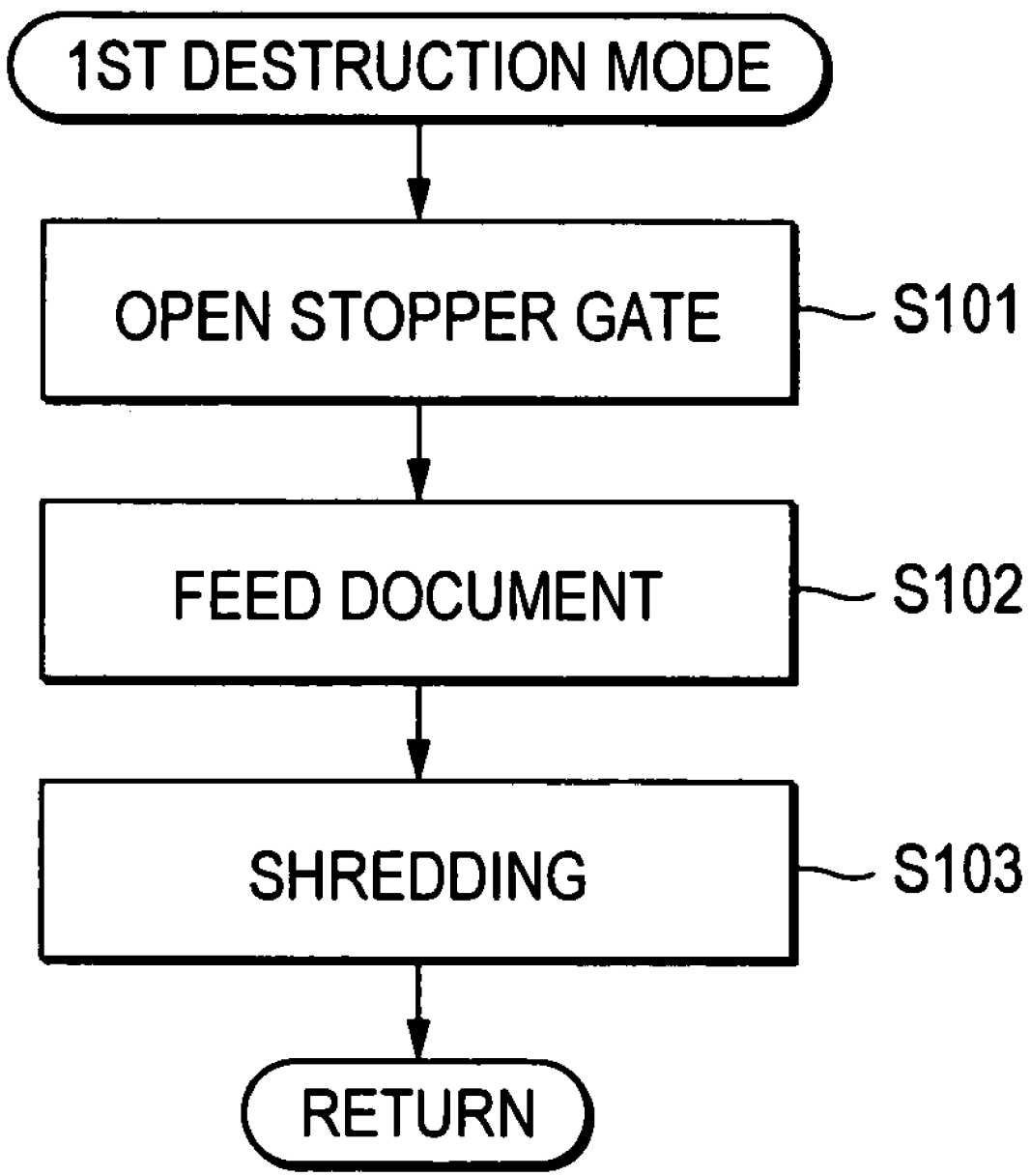
FIG. 10 is a flowchart illustrating a procedure for destroying a document according to a first destruction mode.

FIG. 10 is a flowchart illustrating a procedure for destroying a document according to the first destruction mode in the step S10. First, the document destruction control portion 36 drives the stopper gate drive portion 33 to open the stopper gate 20 in step S101. At that time, the document destruction control portion 36 instructs the feeder drive portion 34 to start the rotation of the feed rolls 21 and 22. According to this instruction, the feeder drive portion 34 starts to rotate-drive the feed rolls 21 and 22.

Therefore, in step S102, the document inserted by a user is fed to the downstream side of the document conveying path as the feed roll 21 rotates. Thus, the document fed by the feed roll 21 is transferred to the feed roll 22 provided at the downstream side in a conveying direction. As the feed roll 22 rotates, the document is conveyed to the shredder portion 24. At that time, the rear end of the document passes through the sensing position of the insertion sensor 18. Consequently, the state of the insertion sensor 18 is changed from the on-state to the off-state. Then, the document destruction control portion 36 drives the stopper gate drive portion 33 with predetermined timing (for example, timing with which the rear end of the document passes through the feed roll 21) to thereby put back the state of the stopper gate 20 to an initial state (a closed state).

When the leading end of the document passes through the sensing position of the pass sensor 23 during the feed roll 22 conveys the document, the state of the pass sensor 23 is changed from the off-state to the on-state. Then, the document destruction control portion 36 instructs the shredder drive portion 35 to start a drive operation. In response to this instruction, the shredder drive portion 36 starts to drive the shredder portion 24. Therefore, the document fed by the feed roll 22 is taken into the shredder portion 24, in which the document is shredded (or destroyed) to be finely cut, in step S103.

Figure 11:
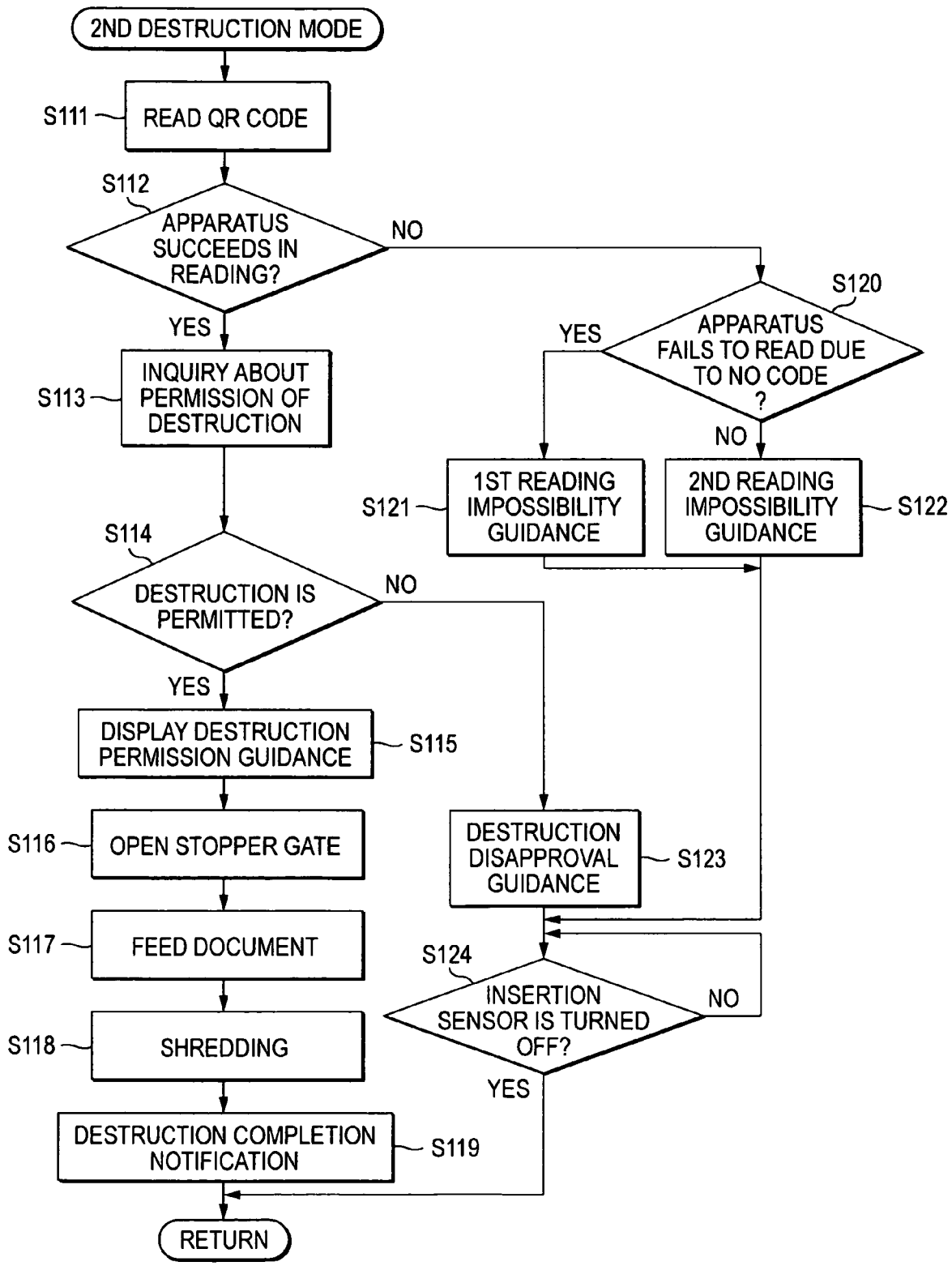
FIG. 11 is a flowchart illustrating a procedure for destroying a document according to a second destruction mode.

FIG. 11 is a flowchart illustrating a procedure for destroying a document according to the second destruction mode in step S11. First, the destruction control portion 36 gives a barcode reading instruction to the barcode reader 32. The barcode reader 32 reads the QR-code printed on the document according to the reading instruction in step S111.

Subsequently, the document destruction control portion 36 determines in step S112 whether the barcode reader 32 succeeds in reading the QR-code. Whether the barcode reader 32 succeeds in reading the QR-code is determined according to whether the barcode reader 32 can normally decode the document ID obtained from the QR-code printed on the document. There are two cases where the barcode reader 32 fails to read the QR-code. A first case is a no-code case that no QR-codes are present in the code reading area E (see FIG. 5), because no QR-codes are printed on the document or because the orientation of the document (that is, the orientation from the front to the rear of the document or the orientation of the leading end to the rear end of the document with respect to the tray portion) at the insertion thereof is inappropriate. A second case is a defective-code case that although a QR-code is present in the code reading area E, a serious contamination or breakage occurs in the QR-code or the decode information obtained from the QR-code includes no document IDs.

In a case where the barcode reader succeeds in reading the QR-code, the document destruction control portion 36 makes an inquiry to the document management apparatus 2 in step S113 about whether the document specified by the document ID included in the information represented by the QR-code is permitted. The inquiry of permission of destruction of the document is performed as follows. That is, a message of an inquiry about the permission of destruction of a document, whose document ID is included in the QR code read by the barcode reader 32, is created. Then, this inquiry message is transmitted to the document management apparatus 2 through the network 4 from the network interface 37. That is, this message of an inquiry about the permission of destruction of a document inquires whether the document specified by the document ID, which is designated in this message, may be destroyed. Incidentally, in a case where the barcode reader succeeds in reading the QR-code, information included in the QR-code may simply be displayed in the operation panel 31.

The document management apparatus 2 having received the inquiry message causes the retrieval portion 13 to retrieve the registered document ID, which is designated by the inquiry message, from the document management table. In a case where the designated document ID is present, the document management apparatus 2 checks the document storage time registered corresponding to the designated document ID. Then, in a case where the storage time of the document has expired at the date and time, at which the document management apparatus 2 receives the inquiry about the permission of the document destruction, the document management apparatus 2 sends a reply message, which indicates that the destruction of the document is permitted, to the document destruction apparatus 3. Conversely, in a case where the storage time of the document has not expired at the date and time, at which the document management apparatus 2 receives the inquiry about the permission of the document destruction, the document management apparatus 2 sends a reply message, which indicates that the destruction of the document is not permitted (that is, the destruction of the document is inhibited), to the document destruction apparatus 3.

Thus, when the reply message is sent from the document management apparatus 2, the document destruction control portion 36 receives the reply message through the network interface 37 and checks in step S114 whether the reply message permits the destruction of the document in response to the inquiry sent from the own apparatus (the document destruction apparatus 3). In a case where the reply message permits the destruction of the document, a preliminarily prepared destruction permission guidance (a guide message) is displayed in the operation panel 31. Thereafter, the stopper gate drive portion 33 is driven to open the stopper gate 20 in steps S115 and S116. At that time, the document destruction control portion 26 instructs the feeder drive portion 34 to start to rotate the feed rolls 21 and 22. In accordance with this instruction, the feeder drive portion 34 starts to rotate-drive the feed rolls 21 and 22. An example of the destruction PERMISSION GUIDANCE is "STOPPER GATE IS OPENED TO DESTROY THIS DOCUMENT. INSERT THE DOCUMENT TO MORE INNER SIDE".

Thereafter, when a user inserts the document into a more inner part according to the guidance displayed in the operation panel 31, the leading end of the document is made to abut against the nip part of the feed roll 21. Also, as the feed roll 21 rotates, the document is fed to the downstream side of the document conveying path in step S117. Thus, the document fed by the feed roll 21 is transferred to the feed roll 22 provided at the downstream side thereof in the conveying direction. Then, as the feed roll 22 rotates, the document is conveyed to the shredder portion 24. At that time, the rear end of the document passes through the sensing position of the insertion sensor 18, so that the state of the insertion sensor 18 is changed from the on-state to the off-state. Then, the document destruction control portion 36 drives the stopper gate drive portion 33 with preliminarily set timing (for example, timing with which the rear end of the document passes through the feed roll 21) and puts back the stopper gate 20 to an initial state (a closed state).

When the leading end of the document passes through the sensing position of the pass sensor 23 during the document is conveyed by the feed roll 22, so that the state of the pass sensor 23 is changed from the off-state to the on-state, the document destruction control portion 36 instructs the shredder drive portion 35 to start to drive. In response to this instruction, the shredder drive portion 35 starts to drive the shredder portion 24. Thus, the document fed by the feed roll 22 is further taken into the shredder portion 24, in which the document is shredded (or destroyed) to be finely cut, in step S118.

Thereafter, the rear end of the document passes through the sensing position of the pass sensor 23. Consequently, the state of the pass sensor 23 is changed from the on-state to the off-state. Then, the document destruction control portion 36 designates the document ID of the document, the destruction of which has been permitted, and transmits a destruction completion notification message, which indicates that the destruction of the document is completed, to the document management apparatus 2 in step S119 after the lapse of a predetermined period (practically, a time taken to cause the rear end of the document to be drawn into the shredder 24 and to finely cut the entire document) since a moment, at which the pass sensor 23 is brought into the off-state. The destruction completion notification message is transmitted from the network interface 37 to the document management apparatus 2 through the network 4. In response to this message, the document management apparatus 2 having received the destruction completion notification message from the document destruction apparatus 3 registers the date and time, at which the apparatus 2 receives the message, in the document destruction date and time field as destruction history information corresponding to the document ID designated by the message.

On the other hand, if the barcode reader 32 fails to read the QR-code in the step S112, the document destruction control portion 36 determines in step S120 whether the cause for the failure is the absence of the code corresponding to the aforementioned first case. Then, if the cause for the failure is the absence of the code, the preliminarily prepared first reading impossibility guidance is displayed in the operation panel 31 in step S121. An example of the first reading impossibility guidance is "NO CODE IS FOUND. PULLOUT DOCUMENT AND CHECK THE POSITION OF CODE AND THE ORIENTATION OF THE DOCUMENT". Meanwhile, in a case where the cause for the failure is the defective code corresponding to the second case, a preliminarily prepared second reading impossibility guidance is "CODE READ ERROR OCCURS. PULL OUT DOCUMENT AND CHECK THE STATE OF CODE".

In a case where the document management apparatus 2 does not permit the destruction of the document in the step S114, a preliminarily prepared destruction disapproval guidance is displayed in the operation panel 31 in step S123. An example of the destruction disapproval guidance is "DESTRUCTION OF THIS DOCUMENT IS INHIBITED. PULL OUT THE DOCUMENT". After the reading impossibility guidance is displayed in steps S121 and S122, and after the destruction disapproval guidance is displayed in step S123, the document destruction control portion 36 determines in step S124 whether the state of the insertion sensor 18 is changed from the on-state to the off-state (that is, whether the document is taken out of the document tray portion 17). If the state of the insertion sensor 18 is changed to the off-state, the document destruction control portion 36 exits from the procedure at that moment.

In the aforementioned document management system, the document management apparatus 2 manages document IDs by associating the document IDs with the storage times of documents, respectively. When a document is destroyed by using the document destruction apparatus 3, the QR-code printed on the document to be destroyed is read by the barcode reader 32. Thus, the document ID included in the QR-code is obtained. Also, the document destruction apparatus 3 makes an inquiry to the document management apparatus 2 about whether the document specified by the document ID is permitted. In a case where a reply to the inquiry indicates that the destruction of the document is permitted, the document destruction apparatus 3 destroys the document. Thus, only the documents, the storage times of which has expired, can surely be destroyed, even when a person in charge does not check whether the destruction of the document may be destroyed, similarly to the related system. Also, occurrence of erroneous destruction of a confidential document due to human checking error cannot be prevented.

The document management system has a first destruction mode, in which a document is destroyed without reading a document ID, and a second destruction mode in which a document is destroyed by reading the document ID and accepting permission of the destruction from the document management apparatus 2. Then, the document destruction apparatus 3, can properly be used according to the kind of the document as follows. That is, in a case where a document with no document ID is destroyed, the first destruction mode is selected. In a case where a document, to which a document ID is added, is destroyed, the second destruction mode is selected. Consequently, document destruction can efficiently be performed in an office environment in which confidential documents and other ordinary documents coexist.

When the document destruction apparatus 3 makes a communication establishment request to the document management apparatus 2, in a case where no communication connection between both the apparatuses 2 and 3 is established (that is, the document destruction apparatus 3 fails to establish the communication therebetween) due to some reason, such as an accident, the second destruction mode is selected according to the destruction mode selection performed by the mode selection portion 42. Thus, ordinary document destruction can be performed without trouble.

The document management apparatus 2 manages a document, which is created by the document creation apparatus, by associating a document ID thereof with a document storage time thereof. Thus, a process from the creation of a document to the destruction of the document can consistently be managed.

When a document is destroyed (or shredded) by the document destruction apparatus 3, the destruction completion notification message designating the document ID of the document is transmitted to the document management apparatus 2. The document management apparatus 2 having received the notification message registers the document destruction date and time in the document management table as destruction history information. Thus, information representing the date and time, at which the document is actually destroyed, together with information representing the fact that the document is destroyed, can be recorded as history information. Also, information representing a user ID of a document destroyer in charge can be recorded as one kind of destruction history information. Consequently, it can be checked later when the document specified by a certain document ID is destroyed, and who destroys the document.

The system can be configured so that when the document creation apparatus 1 creates (or prints) a document, information representing a date and time, at which the document is created, and also representing a user ID of a document creator in charge of the creation of the document, together with the document ID of the document, is registered in the document management table of the document management apparatus 2. Consequently, it can be checked later when the document specified by a certain document ID is created, and who creates the document.

Although the QR-code including the document ID is printed on a document by the aforementioned embodiment, the way of providing the document ID according to the invention is not limited thereto. Numerals and symbols representing the document ID may be printed on the document. The method of adding the document ID to the document is not limited to printing. The document ID may be added to the document by sticking a label thereto.

The document destruction apparatus 3 is assumed to make a communication establishment request when powered on. However, for example, in a case where the document destruction apparatus 3 fails to establish communication when powered on, the document destruction apparatus 3 may iteratively make communication establishment requests at predetermined time periods until the communication connection between the document management apparatus 2 and the document destruction apparatus 3. In this case, when a failure of the network 4 is solved, or when the document management apparatus 2 is recovered after a system failure, the communication connection automatically be established. The set destruction mode can be changed to the second destruction mode.

SECOND EMBODIMENT

Figure 12:
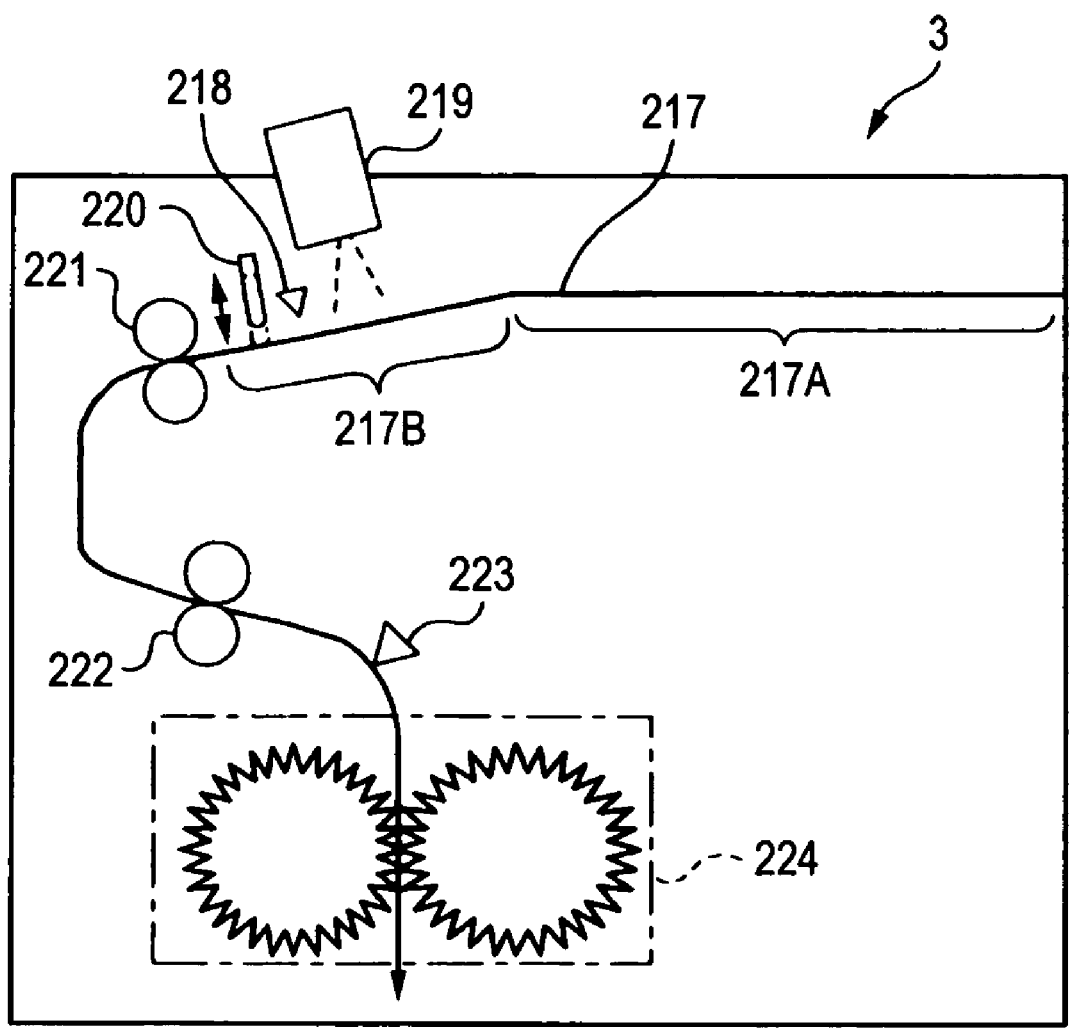
FIG. 12 is a schematic diagram illustrating another example of the mechanism of a document destruction apparatus.

FIG. 12 is a schematic diagram illustrating another embodiment of the mechanism of the document destruction apparatus 3. The document destruction apparatus 3 of this embodiment is configured by using, for instance, a shredder. The document destruction apparatus 3 includes a document tray portion 217, an insertion sensor 218, a barcode scanner 219, a stopper gate 220, feed rolls 221 and 222, a pass sensor 223, and a shredder portion 224.

The tray portion 217 has a guide face that supports a document to be destroyed, in a state in which the document is placed thereon. The guide face (the top face) of the document tray portion 217 includes a horizontal guide face 217A, which includes a horizontal guide face 217A formed in a nearly horizontal position, and also includes an inclined guide face 217B obliquely inclined to the horizontal guide face 217A. The inclined guide face 217B of the document tray portion 217 is formed to gradually lower toward the feed roll 221 in a state in which the guide face 217B is obliquely inclined from an end portion of the horizontal guide face 217A. Also, the inclined guide face 217B of the document tray portion 217 is formed to extend to a position located just short of the feed roll 221 beyond the stopper gate 220. Additionally, another document conveying path is formed at the downstream side of the feed roll 221 by using a chute guide (not shown).

The insertion sensor 218 is operative to detect that a document is inserted to a predetermined position in the document tray portion 217. The "predetermined position" is a position at which the QR-code is disposed in a code reading area E to be read by the barcode scanner 219 in a case where a document is inserted in a normal orientation, that is, a position at which the QR-code printed on the document can be read by the barcode scanner 219. The insertion sensor 218 is constituted by, for example, an optical sensor of the reflection type having a light emitting device and a light receiving device, and is put into an on-state when a document is present at a sensing position, and is brought into an off-state when no document is present at the sensing position.

The barcode scanner 219 is adapted to optically read a barcode added to a document to be destroyed, and is also adapted to output original information included in the barcode printed on the document according to a result of reading the barcode. The barcode scanner 219 is adapted to receive reflection light, which is obtained by reflecting light irradiated from a light source provided in the scanner onto a barcode recording part of the document to be destroyed, at an area sensor through a lens provided in the scanner to thereby provide an image of the barcode into the area sensor. The barcode recording part is a part of a surface of a document, on which a barcode representing information including a document ID is recorded. The position and the size of the barcode recording part are preliminarily determined at a corner portion of the document.

The stopper gate 220 is provided to stop a document, which is to be destroyed, at the predetermined position in an insertion direction in which the document is inserted into the document tray portion 217, and is disposed between the insertion sensor 218 and the feed roll 221. The stopper gate 220 is provided at an entrance part of a document conveying path formed by the feed rolls 221 and 222. The stopper gate 220 serves to open and close the entrance of the document conveying path. In a state in which the stopper gate 220 is closed, the stopper gate 220 is disposed to project to the path to shut off the document path extending from the document tray portion 217 to the feed roll 221. Thus, when the document put on the document tray portion 217 is inserted into an inner side thereof, an end of the document abuts against the stopper gate 220. In contrast, in a state in which the stopper gate 220 is opened, the stopper gate 220 moves back from the document path extending from the document tray 217 to the feed roll 221, and is disposed to be upwardly retreated from the path. Thus, when the document placed on the document tray portion 217 is inserted into an inner side thereof, an end of the document abuts against a nip part of the feed roll 221.

The feed roll 221 rotates while nipping the document inserted by opening the stopper gate 220. Thus, the document is conveyed along the document conveying path. The document conveying path is formed by using a conveying guide member (not shown), such as a chute. The feed roll 222 rotates while nipping the document conveyed by the feed roll 221. Thus, the document is conveyed to the shredder portion 224 along the document conveying path.

The pass sensor 223 is adapted to detect the passage of a document halfway (nearly at the midpoint of) the document conveying path extending from the feed roll 222 to the shredder portion 224. The pass sensor 223 is constituted by, for example, an optical sensor of the reflection type having a light emitting device and a light receiving device. When a document is present at a sensing position, the pass sensor 223 is in an on-state. When a document is absent at the sensing position, the pass sensor 223 is in an off-state. Therefore, when a leading end of the document passes through the sensing position of the pass sensor 223, the state of the pass sensor 223 is simultaneously changed to the off-state to the on-state. Subsequently, when a rear end of the document passes through the sensing position of the pass sensor 223, the state of the pass sensor 223 is simultaneously changed to the on-state to the off-state.

The shredder portion 224 shreds a document fed thereto by the feed roll 222 while drawing the document thereinto in one direction (the direction of an arrow). The shredder portion 224 can collectively shred a multiple-sheet document (for example, a bundle of about 220 sheets of A4-size plain paper) The shredder portion 224 can shred a document, whose sheets are stapled with a staple, without change (that is, without removing the staple).

Figure 13:
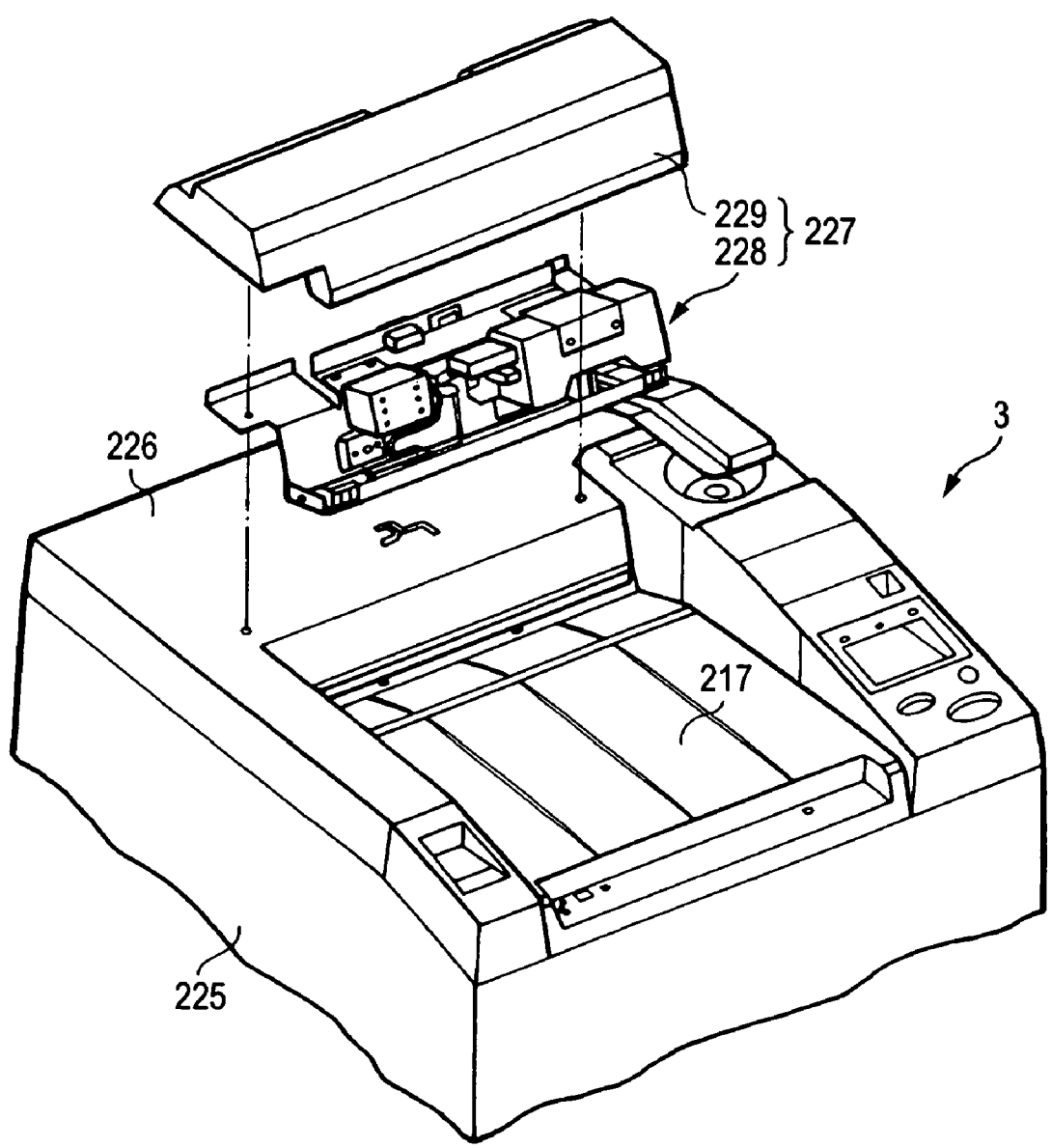
FIG. 13 is a partially exploded diagram illustrating the document destruction apparatus.
Figure 14:
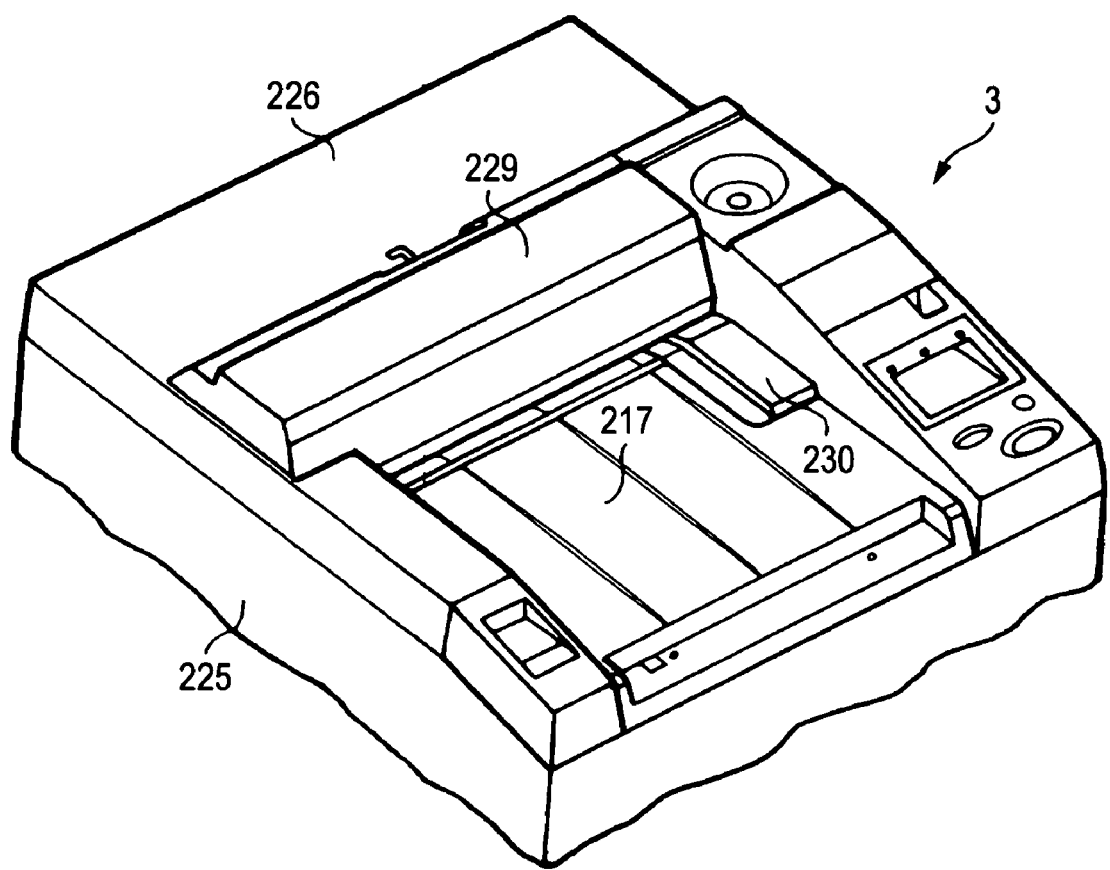
FIG. 14 is a partially exploded diagram illustrating the document destruction apparatus.

FIG. 13 is a partially exploded diagram illustrating the document destruction apparatus 3. The apparatus body 225 of the document destruction apparatus 3 has an upper cover 226 formed integrally therewith. The aforementioned document tray portion 217 is formed integrally with the upper cover 226. The scanning unit 227 is configured to be detachably mounted (or equipped) onto the upper cover 226 of the apparatus body 225 by screws or the like. The scanning unit 227 roughly comprises a unit body 228 and a unit cover 229. The unit cover 229 is a resin cover that covers the unit cover 229 when the scanning unit 227 is mounted on the apparatus body 225. FIG. 14 illustrates a manner in which the scanning unit 227 is actually mounted on the upper cover 226 of the apparatus body 225.

Figure 15:
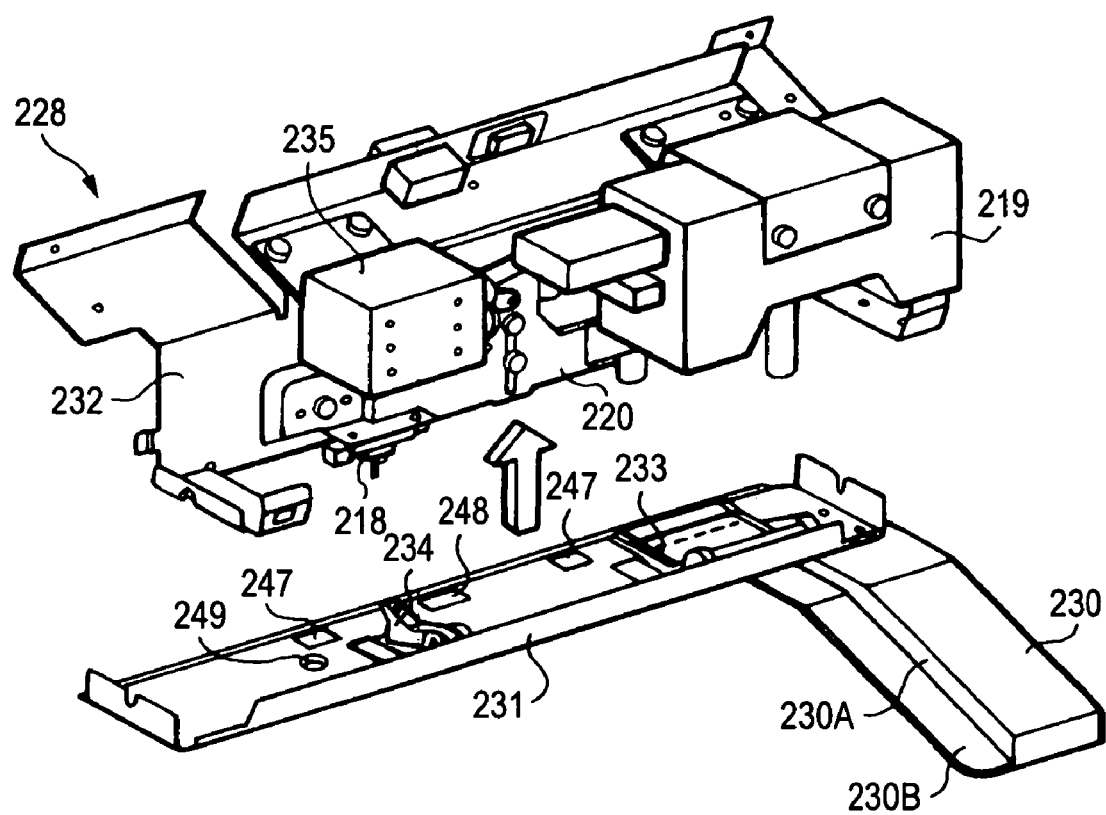
FIG. 15 is a partially exploded perspective diagram illustrating a unit body.

FIG. 15 is a partially exploded perspective diagram illustrating the unit body.228. The unit body 228 has a side guide 230, a first frame member 231, and a second frame member 232. The side guide 230 is constituted by, for example, an integrally molded product. The side guide 230 is attached to an end portion of the first frame member 231 by using screws. The side guide 230 is adapted to be disposed at one side end part of the first frame member 231 when the unit body 228 is attached to the upper cover 226. A guide face 230A extending in an insertion direction, in which a document is inserted, and a chute face 230B, which extends perpendicular to the guide face 230A (that is, a cross-section of the guide face 230A and the chute face 230B is L-shaped), are formed in the side guide 230.

Figure 16:
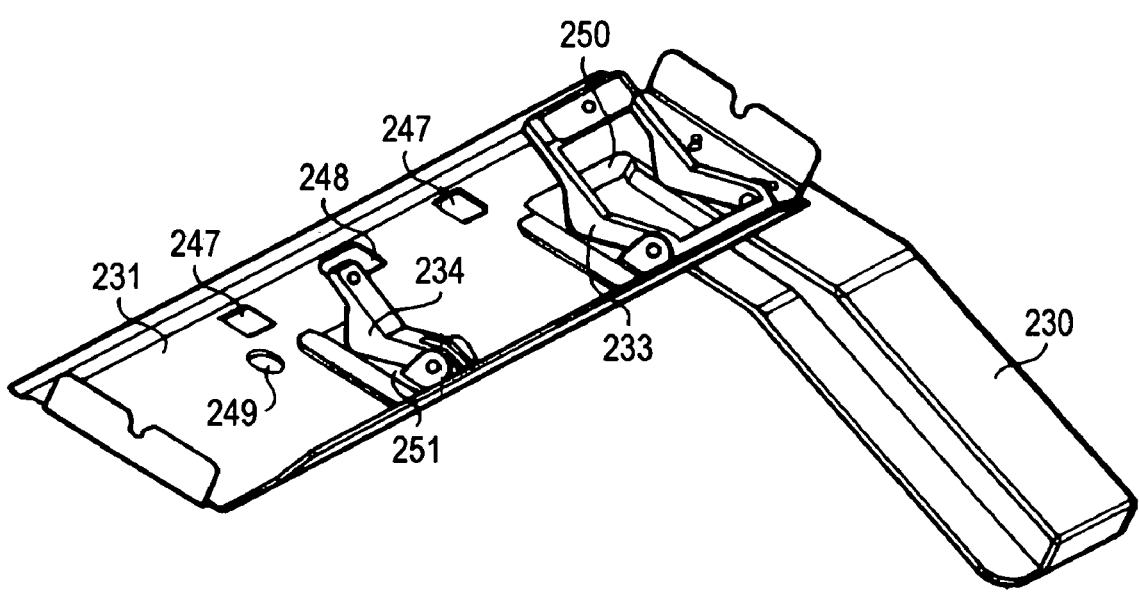
FIG. 16 is a perspective diagram illustrating a component of the unit body.

The first frame member 231 is configured to form a document insertion guide path between the first frame member 231 and the document tray portion 217 and to be attached to the apparatus in a state in which a predetermined gap is interposed therebetween. As shown in FIG. 16, a first weight member 233 and a second weight member 234 are mounted on the first frame 231. Each of the weight members 233 and 234 is supported on the first frame 231 swingably around a shaft provided thereon. The weight members 233 and 234 run on the document with the own weights thereof to thereby prevent a leading end of the document from floating.

A gate solenoid 235 is attached to the second frame member 232, in addition to the insertion sensor 218, the barcode scanner 219, and the stopper gate 220. The gate solenoid 235 serves as a driving force source to be used to open and close the stopper gate 220.

Figure 17:
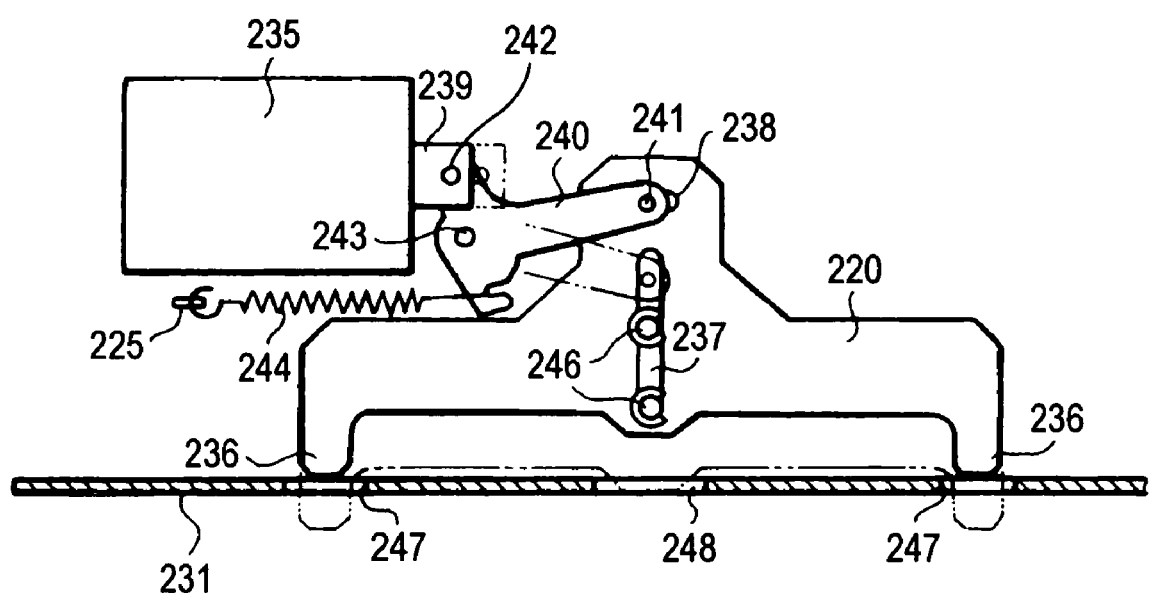
FIG. 17 is a diagram illustrating a drive mechanism for a stopper gate.

FIG. 17 is a diagram illustrating a drive mechanism that drives the stopper gate 220 by using the gate solenoid 235. The stopper gate 220 is constituted by, for example, a resin plate-like member and has a pair of left and right stopper portions 236, which are integrally formed, and also has a longitudinally elongated guide hole 237, and a laterally elongated guide hole 238. The pair of stopper portions 236 is formed on both the left and right ends of the stopper gate 220, respectively, to downwardly protrude therefrom. The guide hole 237 is formed in a central portion in the direction (that is, in the lateral direction, as viewed in FIG. 17) of width of the stopper gate 220. The guide hole 238 is formed in a central portion in the direction of width of the stopper gate 220 and nearly just above the guide hole 237.

The gate solenoid 235 has an output shaft 239 formed integrally therewith. The output shaft 239 is connected to the stopper gate 220 through an operating arm 240. That is, the operating arm 240 is connected to the stopper gate 220 by using a first engaging pin 241. The first engaging pin 241 is engaged with the guide hole 238 of the stopper gate 220.

The operating arm 240 is supported turnably around a shaft 243 provided on the second frame member 232. An end of a tension coil spring 244 is engaged with the operating arm 241. The other end of the tension coil spring 244 is engaged with a spring hook portion 245 formed integrally with a second frame 242. The tension coil spring 244 is a member adapted to push the operating arm 240 around the shaft 243 in one direction (that is, clockwise, as viewed in the figure).

The stopper gate 220 is upwardly and downwardly movably supported by a pair of upper and lower guide pints 246 provided on the second frame member 232. Each of the guide pins 246 is engaged with the guide hole 237 in the stopper gate 220. The guide pins 246 are disposed apart from each other at a predetermined distance in an up-down direction. A slip-off-prevention ring (for example, a C-ring) is provided on each of the guide pins 246 to prevent the stopper gate 220 from slipping off the second frame member 232.

Gate holes 247 through which the stopper portions 236 are respectively inserted or pulled out, a relief hole 248 used to prevent the first frame member 231 form being in contact with the stopper gate 220, a detection window for the insertion sensor 218, an opening portion 250 allowing the bottom portion of the first weight member 234 to abut against the document tray portion 217, and an opening portion 251 allowing the bottom portion of the second weight member 235 to abut against the document tray portion 217 are formed in the first frame member 231.

When the state of the gate solenoid 235 is changed from a non-excited state to an excited state in the drive mechanism of the stopper gate 220, the output shaft 239 is drawn into a solenoid body against the pushing force of the tension coil spring 244. Consequently, the operating arm 240 rotates around the shaft 241 counterclockwise. Also, the stopper gate 220 is pulled up by the operating arm 240. Thus, the stopper portion 236 of the stopper gate 220 is placed to be retracted from the gate hole 247 of the first frame member 231. In a state in which the scanning unit 227 is mounted on the upper cover 226 of the apparatus body 225, the stopper portion 236 of the stopper gate 220 is spaced apart from the inclined guide face 217B of the document tray portion 217 (that is, the stopper gate 220 is opened).

In contrast, when the state of the gate solenoid 235 is changed from an excited state to a non-excited state, the operating arm 240 is rotated clockwise around the shaft 241 by the pushing force of the tension coil spring 244. Consequently, the output shaft 239 of the gate solenoid 235 is pulled out of the solenoid body. Also, the stopper gate 220 is pushed down by the operating arm 240. Thus, the stopper portion 236 of the stopper gate 220 is placed to downwardly protrude from the gate hole 247 of the first frame member 231. In the state in which the scanning unit 227 is mounted on the upper cover 226 of the apparatus body 225, the stopper portion 236 of the stopper gate 220 abuts against the inclined guide face 217B of the document tray portion 217 (that is, the stopper gate 220 is closed).

Figure 18:
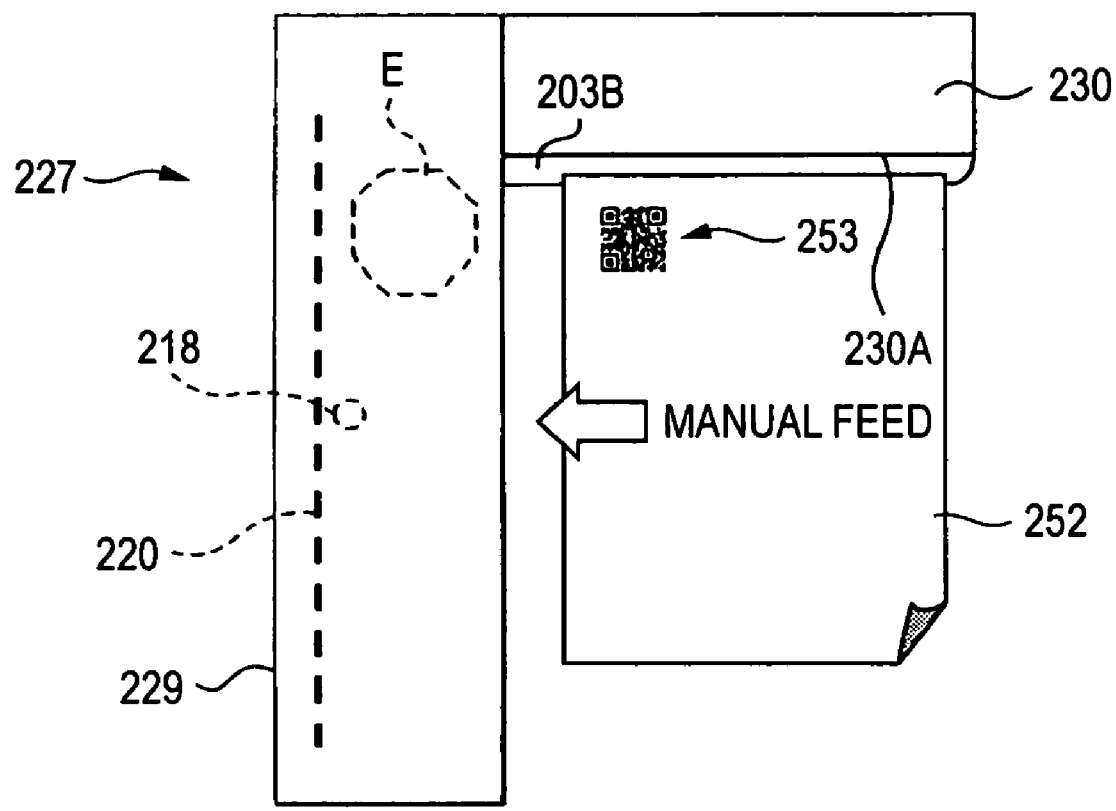
FIG. 18 is a diagram illustrating a scanning unit, which is taken from above.

FIG. 18 is a diagram illustrating the scanning unit 227, which is taken from above. The guide face 230A of the side guide 230 is arranged in a direction parallel to an insertion direction (that is, the direction of an arrow) in which a document 252 is manually inserted. The document 252 to be destroyed is inserted in an orientation so that a part, on which a QR-code 253 is recorded (or printed), is disposed at a leading-side corner portion thereof. At that time, to position the document 252 in a direction perpendicular to the insertion direction, the document 252 is located alongside the guide face 230A of the side guide 230 by causing one of side edges of the document 252 to abut against the guide face 230A. A part being close to the one of side edges of the document 252 is put on the chute face 230B of the side guide 230.

Consequently, in a state in which a user manually feeds the document 252 to thereby cause an end of the document 252 to abut against the stopper gate 220, the part, on which the QR-code 253 is recorded, is positioned and located in the code reading area E to be read by the barcode scanner 219. The insertion sensor 218 is disposed (just) short of the stopper gate 220. Thus, when an end of the document 252 manually fed by the user abuts against the stopper gate 220, the state of the insertion sensor 218 is changed from the off-state to the on-state just before then. Consequently, timing, with which the insertion sensor 218 is turned on, indicates timing with which the QR-code 253 printed on the document 252 is disposed in the code reading area E.

Figure 19:
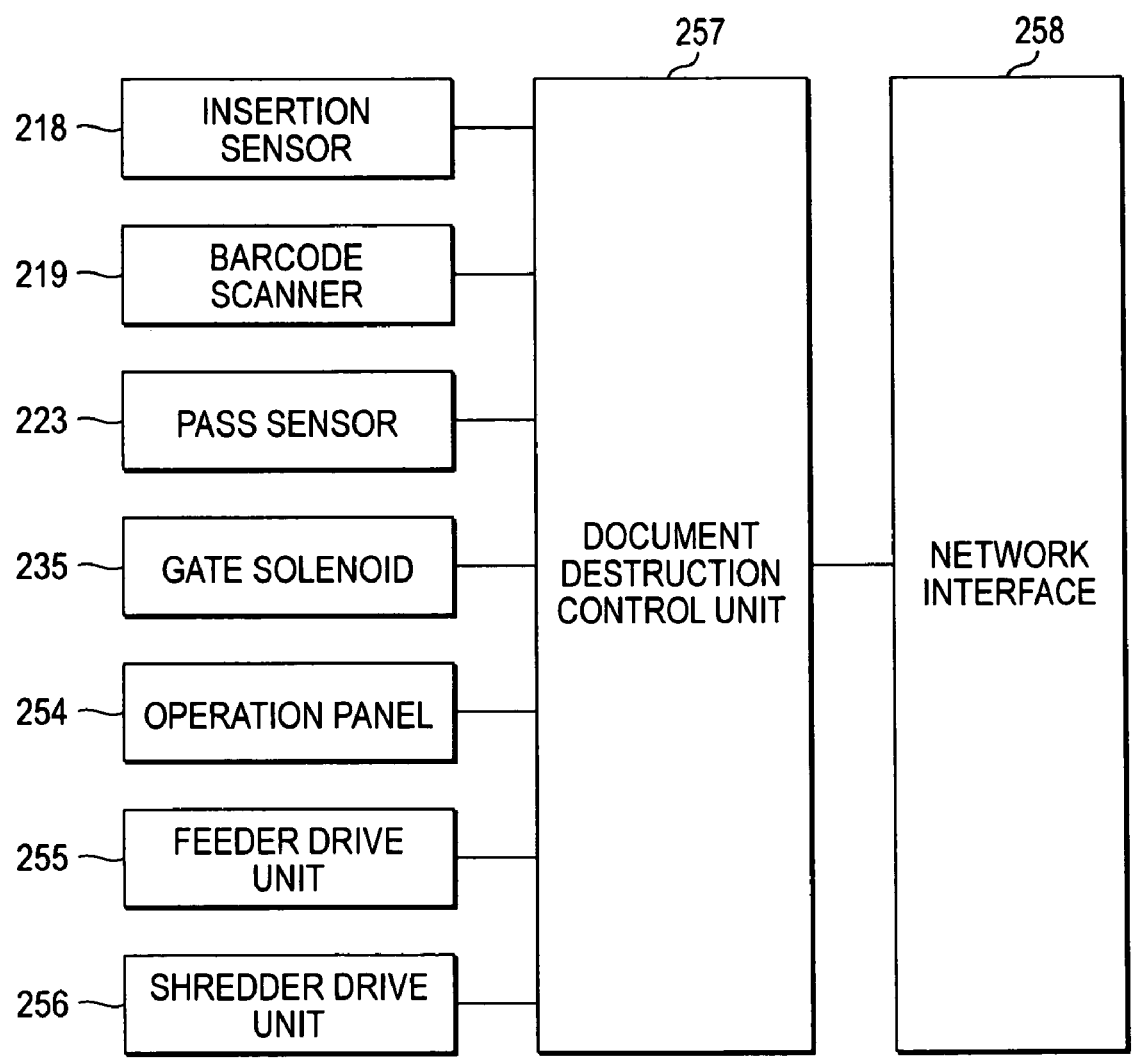
FIG. 19 is a block diagram illustrating an example of the configuration of a document destruction apparatus.

FIG. 19 is a block diagram illustrating an example of the configuration of the document destruction apparatus 3. The document destruction apparatus 3 includes an operation panel 254, a feeder drive portion 255, a shredder drive portion 235, a mode selection portion 256, a document destruction control portion 257, and a network interface 258, in addition to the aforementioned components.

The operation panel 254 is operated by a user who uses the document destruction apparatus 3. The operation panel 254 is mounted in the upper cover 226 of the apparatus body 225. The operation panel 254 is constituted by using, for instance, operating buttons (for example, a start button, and a stop button) and a display panel on which various kinds of messages including guidance on the operating states and the operations of the document destruction apparatus 3 (guide messages) are displayed.

The feeder drive portion 255 causes the aforementioned feed rolls 221 and 222 to perform rotation operations. The feeder drive portion 255 can be constituted by using a motor as a driving force source.

The shredder drive portion 256 rotate-drives the aforementioned shredder portion 224. The shredder drive portion 256 can be constituted by using a motor as a driving force source.

The document destruction control portion 257 controls various processing operations, which relate to the document destruction, according to a predetermined control program. The barcode scanner 219, the operation panel 254, the gate solenoid 235, the feeder drive portion 255, and the shredder drive portion 256, the operations of which are controlled, are electrically connected to the document destruction control portion 257. Also, the insertion sensor 218 and the pass sensor 223 are electrically connected to the document destruction control portion 257.

The network interface 258 is a communication interface through which the document destruction apparatus 3 transmits and receives data to and from other apparatuses (including the document creation apparatus 1 and the document management apparatus 2) on the network 4. The data transmission and reception using the network interface 258 are controlled by the document destruction control portion 257.

Subsequently, a document management method using the document management system of the aforementioned configuration is described below. First, documents treated by the system according to the invention are created by the document creation apparatus 1 by assigning a unique document ID to each of the documents. The document ID may be constituted by either only numerals or an appropriate combination of alphanumeric characters and symbols. Hereinafter, a practical document management method in the case of treating documents, which are used as exhibits at an account audit and a tax inspection, is described.

Figure 20A:
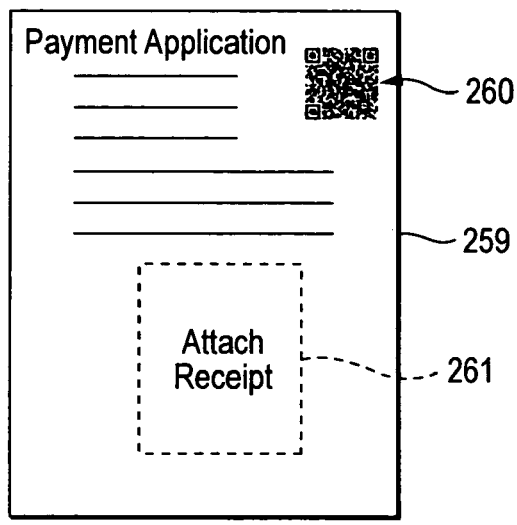
FIGS. 20A and 20B are explanatory diagrams each illustrating an example of the creation of a document.

First, document data (electronic data) representing a template for a document with a barcode is inputted to the document creation apparatus 1. The document data is outputted at the image output portion 8 by being printed on a sheet of paper. Thus, as illustrated in FIG. 20A, a mount corresponding to a payment application 259 is created. The document data may be generated by, for instance, the document management apparatus 2. Then, the generated document data may be inputted to the document creation apparatus 1 through the network 4 from the document management apparatus 2. Alternatively, the document data may be generated by a server apparatus used to document data. Then, the generated document data may be inputted to the document creation apparatus 1 through the network from the server apparatus.

Figure 20B:
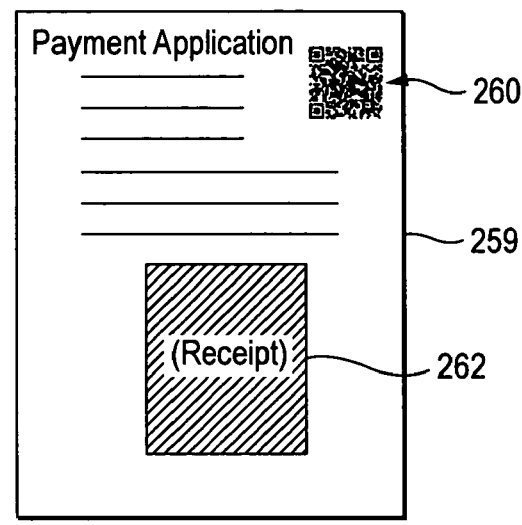

A QR-code 260 including a document ID assigned to a payment application 259 as a piece of information is added to a corner portion of the payment application 259, which is created by the document creation apparatus 1, by printing. That is, the payment application 259 created by the document creation apparatus 1 corresponds to a "document to which a document ID is added". A region 261, on which a receipt is mounted, is provided in the mount corresponding to the payment application 259. Thus, as illustrated in FIG. 20B, a receipt 262 is attached onto the mount corresponding to the payment application 259. According to need, an applicant performs a retouch and apposition of a seal (or impression of a seal) thereon. Thus, an original of the payment application 259 is created.

Upon completion of creating the payment application 259, the created payment application 259 is set on the original table of the document creation apparatus 1. Then, an image of the payment application 259 is read by the image reading portion 6. Image data representing the payment application 259, which is read by the image reading portion 6, is transmitted to the document management apparatus 2 through the network 4. Upon completion of reading, the original of the payment application 259 is stored in a file or the like.

On the other hand, the document management apparatus 2 having received the image data (or scan data) representing the payment application 259 from the document creation apparatus 1 causes the database portion 214 to store the image data. Also, an image representing the QR-code included in the image data is analyzed by the barcode analysis portion 212. Thus, decode information representing the document ID assigned to the payment application 259 is obtained. Then, the obtained document ID is registered in the document management table by the document management control portion 215. The document management table is created in the database portion 214.

FIG. 21 is a diagram illustrating an example of the document management table. As illustrated in this figure, the document ID, the document creation date and time, the document storage time, and the document destruction date and time are registered in the document management table by being associated with one another. In the case of registering the document creation date and time and the document destruction date and time, it is preferable to use a standard time obtained from a time distribution server or a time authentication server. Data obtained by decoding the QR-code in the barcode analysis portion 212 may be registered as the document ID. Alternatively, data assigned to the aforementioned document with the barcode by the document management apparatus itself 2 or another server apparatus when the document management apparatus 2 or the latter server apparatus generates such document data. The document creation data and time indicates a date and time, at which the document is created. According to the present embodiment, a date and time, at which the document creation apparatus 1 transmits the image data read from the document, such as the payment application 259, to the document management apparatus 2, or a date and time, at which the image data transmitted from the document creation apparatus 1 is received by the document management apparatus 2, is assumed to be registered as the "document creation date and time".

The document storage time indicates the date and time representing the document storage time. It is necessary to store the document, whose document ID is registered in the document management table, until the document storage time expires. Incidentally, in a case where the document storage time is registered as being "permanent", the document can be destroyed at any time. In a case where the document storage time is registered as being "non-designated", the document cannot be destroyed at all times.

Generally, the storage time of a receipt is determined according to a received amount of money. Thus, in a case where information for setting the document storage time is included in, for instance, the QR-code printed on the payment application 259 in addition to information representing the document ID, the document storage time can automatically be set from the decode information obtained by the barcode analysis portion 212. Practically, the date and time corresponding to 6 years reckoned from the date and time, at which the payment application 259 is created, can be set as the document storage time by causing the QR-code to include information designating 6 years as the document storage time of the payment application 259. Another way is that the QR-code is caused to include information representing the received amount of money described in the receipt that is attached to the payment application 259. Thus, the storage time of the receipt is automatically calculated from this information and can be set in the document management table as the document storage time. Additionally, a user can set or change the document storage time in the document management table by performing a manual input (operation) and using the user interface portion 211 of the document management apparatus 2.

The document destruction date and time indicates a date and time at which a document is destroyed. The destruction of the document is performed by the document destruction apparatus 3. Thus, a date and time, at which the document destruction apparatus 3 sends to the document management apparatus 2 a notification (hereunder referred to also as a "destruction completion notification") indicating that destruction of the document, whose document ID is designated, is completed, is registered in the document management table as the document destruction date and time.

Incidentally, the system maybe configured so that a user ID of a user having created a document by using the document creation apparatus 1 is registered in the document management table as data indicating a document creator, and that a user ID of a user having destroyed a document by using the document destruction apparatus 3 is registered in the document management table as data indicating a document destroyer. In this case, ID information on a user having created or destroyed a document can be obtained by utilizing existing user authentication techniques (for example, the user authentication technique using an IC card).

Figure 22:
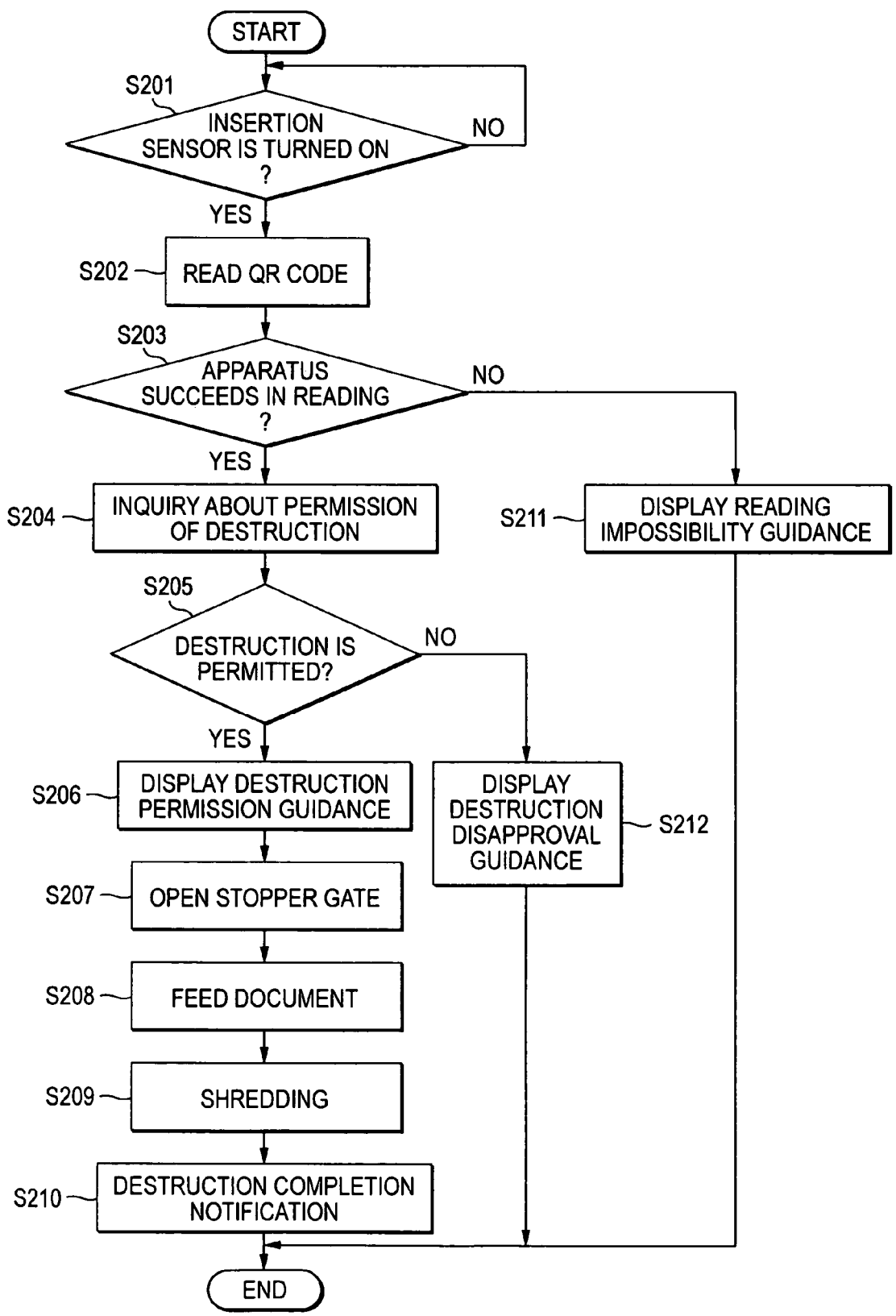
FIG. 22 is a flowchart illustrating a procedure for processing performed in the document destruction apparatus.

FIG. 22 is a flowchart illustrating a procedure for destroying a document in the document destruction apparatus 3. The document destruction apparatus 3 has an ordinary destruction mode, in which a document to be destroyed is destroyed without reading the document ID (that is, the QR-code) of the document, and a scan destruction mode in which the document ID of the document to be destroyed is read and in which the document destruction apparatus 3 makes an inquiry to the document management apparatus 2 about whether the document ID of the document to be destroyed, which is designated by the read document ID, is permitted, and in which the document is destroyed in a case where the destruction of the document is permitted by the document management apparatus 2. The flowchart shown in FIG. 22 illustrates the procedure in the scan destruction mode.

When the start button provided on the operation panel 254 is depressed by a user during the document destruction apparatus 3 is in a standby state in the ordinary destruction mode, the document destruction control portion 257 instructs the gate solenoid 235, the feeder drive portion 255 and the shredder drive portion 254 to start driving, thereby to open the stopper gate 220. Also, the feeder drive portion 255 and the shredder drive portion 254 start driving the feed rolls 221 and 222, and the shredder portion 224, respectively. Consequently, when a user using the document destruction apparatus 3 puts a document, which is to be destroyed, on the document tray portion 217 and inserts the document to an inner side thereof, a leading end of the document is nipped by the feed rolls 221 and drawn into the apparatus 3. The document is conveyed by the rolls 221 and 222 and is then shredded (or destroyed) by the shredder portion 224.

When the stop button of the operation panel 254 is depressed by the user after the start button of the operation panel 254 is depressed as described above, or when a predetermined time elapses since the start button is depressed, the document destruction control portion 257 instructs the gate solenoid 235, the feeder drive portion 255 and the shredder drive portion 256 to stop driving. Thus, the state of the stopper gate 220 is returned to a closed state. Also, the feeder drive portion 255 and the shredder drive portion 256 stop driving the feed rolls 221 and 222 and the shredder portion 224, respectively. Consequently, the state of the document destruction apparatus 3 is returned to the standby mode again.

In contrast, in the scan destruction mode, a user using the document destruction apparatus 3 puts a document, which is to be destroyed, on the document tray portion 217 and then inserts the document into an inner part thereof. At that time, in a case where the QR-code is printed on the document to be destroyed, the user inserts the document 252 in an orientation so that a surface, on which the QR-code 253 is printed, is the topmost face (that is, this surface is turned upward) and that the QR-code printing part, on which the QR-code 253 is printed, is placed at the downstream side in the insertion direction.

Figure 23A:
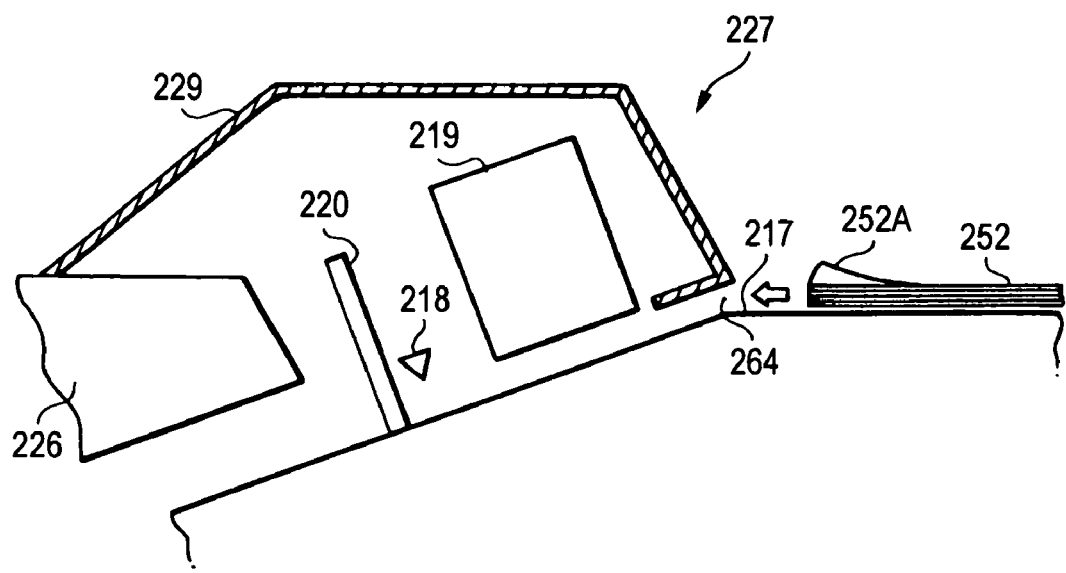
FIGS. 23A-23C are explanatory diagrams illustrating a trouble that may occur when a document is inserted into the document destruction apparatus.
Figure 23B:
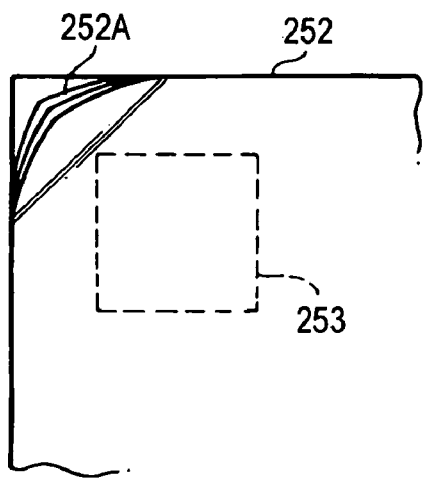
Figure 23C:
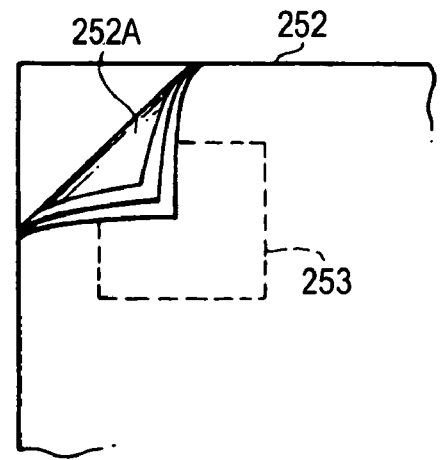

In a case where the document 252 put on the document tray portion 217 is, for example, an old document having been iteratively read or a document having been circulated around many departments, a corner portion of the document 225 is often curled up, as illustrated in FIG. 23A. In a case where the curling-up of a corner part in the vicinity of the part, on which the QR-code 253 is printed, occurs, as shown in FIG. 23B, a curled-up part 252A of the document 252 abuts against a document insertion port (a document loading port) 264 into which the document 252 is manually inserted by a user. The curled-up part 252A is inserted into an inner part of the document insertion port by maintaining a folded condition thereof. Then, as illustrated in FIG. 23C, a part of the A Q-code 253 is hidden by folding the curled-up part 252A. Consequently, the QR-code 253 printed on the document 252 cannot normally be read by the barcode scanner 219.

Figure 24:
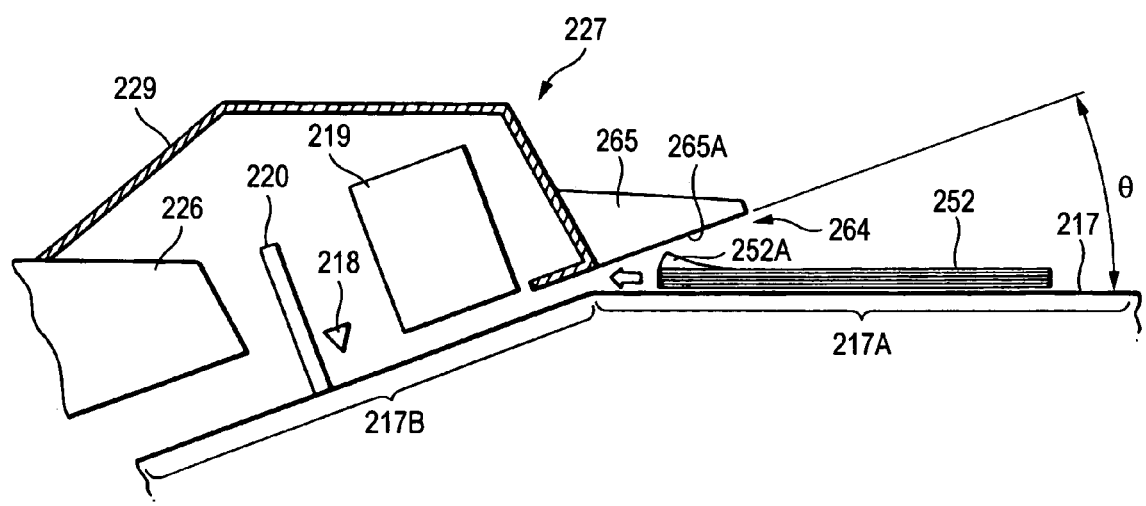
FIG. 24 is a diagram illustrating the configuration of an apparatus adapted to solve the trouble caused when a document is inserted into the document destruction apparatus.

Thus, as illustrated in FIG. 24, a document loading chute 265 is provided at the document insertion port integrally with or separately from the unit cover 229 of the scanning unit 227 in the document destruction apparatus 3 according to the present embodiment. The document loading chute 265 is a member adapted to straighten, in a case where a curled-up part 252A caused at a leading end side of the document 252 that is put on the document tray portion 217, this curled-up part.

The document loading chute 265 is provided to protrude from a front part of the unit cover 229 toward the horizontal guide face 217A. The document loading chute 265 has a guide face 265A that is formed integrally therewith, and that is disposed in parallel to the inclined guide face 217B of the document tray portion 217. The guide face 265A is disposed like an eave above the document insertion port and is formed so that a predetermined angle θ is formed between the guide face 265A and the horizontal guide face 217A of the document tray portion 217. The predetermined angle θ is appropriately set within an angular range from 215 degrees to 230 degrees. The gap in an up-down direction between the horizontal guide face 217A of the document tray portion 217 and the guide face 265A of the document loading chute 265 gradually decreases toward the inner part of the document insertion port.

Even in a case where the curled-up part 252A is caused at the leading end side of the document 252 put on the document tray portion 217, when the document 252 is manually inserted into the document insertion port by a user, the curled-up part 252A is gradually forced down while being in contact with the guide face 265A of such a document loading chute 265, because the document loading chute 265 is provided at the document insertion port. Thus, the curled-up part of the document 252 is straightened by the document loading chute 265. Consequently, the QR-code 253 of the document 252 can normally be read by the barcode scanner 219.

Also, when a document is inserted as described above, the state represented by a signal outputted from the insertion sensor 218 is changed from the off-state to the on-state immediately before the leading end of the document abuts against the stopper gate 220. At that time, the document destruction control portion 257 continuously monitors the state (the on-state or the off-state) represented by the signal outputted from the insertion sensor 218 in step S201. When the insertion sensor 218 is brought into the on-state by the user's insertion of the document, the document destruction control portion 257 gives a reading instruction to instruct the barcode scanner 219 to read the barcode. Then, according to the reading instruction, the barcode scanner 219 reads the QR-code printed on the document in step S202. At that time, the first weight member 233 and the second weight member 234 suppress the floating of the document at the side of the leading end of the document, especially, at the position, at which the barcode scanner 219 reads the QR-code, in the code reading area E. Thus, the QR-code printed on the document can be disposed facing the barcode scanner 219. Consequently, the barcode scanner 219 can reliably read the QR-codes.

Subsequently, the document destruction control portion 257 determines in step S203 whether the barcode scanner 219 succeeds in reading the QR-code. Whether the barcode scanner 219 succeeds in reading the QR-code is determined according to whether the barcode scanner 219 can normally decode the document ID obtained from the QR-code printed on the document. There are two major cases where the barcode scanner 219 fails to read the QR-code. A first case is a no-code case that no QR-codes are present in the code reading area E (see FIG. 18), because no QR-codes are printed on the document or because the orientation of the document (that is, the orientation from the front to the rear of the document or the orientation of the leading end to the rear end of the document with respect to the tray portion) at the insertion thereof is inappropriate. A second case is a defective-code case that although a QR-code is present in the code reading area E, a serious contamination or breakage occurs in the QR-code or the decode information obtained from the QR-code includes no document IDs.

In a case where the barcode scanner succeeds in reading the QR-code (YES in step S203), the document destruction control portion 257 makes an inquiry to the document management apparatus 2 in step S204 about whether the document specified by the document ID included in the information represented by the QR-code is permitted. The inquiry of permission of destruction of the document is performed as follows. That is, a message of an inquiry about the permission of destruction of a document, whose document ID is included in the QR code read by the barcode scanner 219, is created. Then, this inquiry message is transmitted to the document management apparatus 2 through the network 4 from the network interface 258. That is, this message of an inquiry about the permission of destruction of a document inquires whether the document specified by the document ID, which is designated in this message, may be destroyed. Incidentally, in a case where the barcode scanner succeeds in reading the QR-code, information included in the QR-code may simply be displayed in the operation panel 254.

The document management apparatus 2 having received the inquiry message causes the retrieval portion 213 to retrieve the registered document ID, which is designated by the inquiry message, from the document management table. In a case where the designated document ID is present, the document management apparatus 2 checks the document storage time registered corresponding to the designated document ID. Then, in a case where the storage time of the document has expired at the date and time, at which the document management apparatus 2 receives the inquiry about the permission of the document destruction, the document management apparatus 2 sends a reply message, which indicates that the destruction of the document is permitted, to the document destruction apparatus 3. Conversely, in a case where the storage time of the document has not expired at the date and time, at which the document management apparatus 2 receives the inquiry about the permission of the document destruction, the document management apparatus 2 sends a reply message, which indicates that the destruction of the document is not permitted (that is, the destruction of the document is inhibited), to the document destruction apparatus 3.

Thus, when the reply message is sent from the document management apparatus 2, the document destruction control portion 257 receives the reply message through the network interface 258 and checks in step S205 whether the reply message permits the destruction of the document in response to the inquiry sent from the own apparatus (the document destruction apparatus 3). In a case where the reply message permits the destruction of the document, a preliminarily prepared destruction permission guidance (a guide message) is displayed in the operation panel 254. Thereafter, the gate solenoid 235 is instructed to open the stopper gate 220 in steps S206 and S207. At that time, the document destruction control portion 257 instructs the feeder drive portion 234 to start to rotate the feedrolls 221 and 222. In accordance with this instruction, the feeder drive portion 255 starts to rotate-drive the feed rolls 221 and 222. An example of the destruction permission guidance is "THIS DOCUMENT IS DESTROYED. INSERT THE DOCUMENT TO MORE INNER SIDE".

Thereafter, when a user inserts the document into a more inner part according to the guidance displayed in the operation panel 254, the leading end of the document is made to abut against the nip part of the feed roll 221. Also, as the feed roll 221 rotates, the document is fed to the downstream side of the document conveying path in step S208. Thus, the document fed by the feedroll 221 is transferred to the feedroll 222 provided at the downstream side thereof in the conveying direction. Then, as the feed roll 222 rotates, the document is conveyed to the shredder portion 224. At that time, the rear end of the document passes through the sensing position of the insertion sensor 218, so that the state of the insertion sensor 218 is changed from the on-state to the off-state. Then, the document destruction control portion 257 instructs the gate solenoid 235 with preliminarily set timing (for example, timing with which the rear end of the document passes through the feed roll 221) to return the stopper gate 220 thereby to put back the stopper gate 220 to an initial state (a closed state).

When the leading end of the document passes through the sensing position of the pass sensor 223 during the document is conveyed by the feed roll 222, so that the state of the pass sensor 223 is changed from the off-state to the on-state, the document destruction control portion 257 instructs the shredder drive portion 256 to start to drive. In response to this instruction, the shredder drive portion 256 starts to drive the shredder portion 224. Thus, the document fed by the feed roll 222 is further taken into the shredder portion 224, in which the document is shredded (or destroyed) to be finely cut, in step S209.

Thereafter, the rear end of the document passes through the sensing position of the pass sensor 223. Consequently, the state of the pass sensor 223 is changed from the on-state to the off-state. Then, the document destruction control portion 257 designates the document ID of the document, the destruction of which has been permitted, and transmits a destruction completion notification message, which indicates that the destruction of the document is completed, to the document management apparatus 2 in step S210 after the lapse of a predetermined period (practically, a time taken to cause the rear end of the document to be drawn into the shredder 224 and to finely cut the entire document) since a moment, at which the pass sensor 223 is brought into the off-state. The destruction completion notification message is transmitted from the network interface 258 to the document management apparatus 2 through the network 4. In response to this message, the document management apparatus 2 having received the destruction completion notification message from the document destruction apparatus 3 registers the date and time, at which the apparatus 2 receives the message, in the document destruction date and time field as destruction history information corresponding to the document ID designated by the message.

Meanwhile, if the document destruction control portion 257 determines in the step S203 that the barcode scanner 219 fails to read the QR-code, a preliminarily prepared reading impossibility guidance is displayed in the operation panel 254 in step S211. An example of the reading impossibility guidance is "CODE READING ERROR OCCURS. PULL OUT DOCUMENT". In a case where the document management apparatus 2 does not permit the destruction of the document in the step S205, a preliminarily prepared destruction disapproval guidance is displayed in the operation panel 254 in step S212. An example of the destruction disapproval guidance is "BECAUSE THE STORAGE TIME OF THIS DOCUMENT DOES NOT EXPIRE, THIS DOCUMENT CANNOT BE DESTROYED. PULL OUT THE DOCUMENT". After the destruction completion notification is transmitted, the state of the document destruction apparatus 3 immediately returns to the standby state. However, after the reading impossibility guidance is displayed in step S211, or after the destruction disapproval guidance is displayed in step S212, the state of the document destruction apparatus 3 is returned to the standby state after the state of the insertion sensor 218 is changed from the on-state to the off-state (that is, after the user pulls the document out of the document tray portion 217).

In the aforementioned document management system, the document management apparatus 2 manages document IDs by associating the document IDs with the storage times of documents, respectively. When a document is destroyed by using the document destruction apparatus 3, the QR-code printed on the document to be destroyed is read by the barcode scanner 219. Thus, the document ID included in the QR-code is obtained. Also, the document destruction apparatus 3 makes an inquiry to the document management apparatus 2 about whether the document specified by the document ID is permitted. In a case where a reply to the inquiry indicates that the destruction of the document is permitted, the document destruction apparatus 3 destroys the document. Thus, only the documents, the storage times of which has expired, can surely be destroyed, even when a person in charge does not check whether the destruction of the document maybe destroyed, similarly to the related system. Also, occurrence of erroneous destruction of a confidential document due to human checking error cannot be prevented.

The document management apparatus 2 manages a document, which is created by the document creation apparatus, by associating a document ID thereof with a document storage time thereof. Thus, a process from the creation of a document to the destruction of the document can consistently be managed.

When a document is destroyed (or shredded) by the document destruction apparatus 3, the destruction completion notification message designating the document ID of the document is transmitted to the document management apparatus 2. The document management apparatus 2 having received the notification message registers the document destruction date and time in the document management table as destruction history information. Thus, information representing the date and time, at which the document is actually destroyed, together with information representing the fact that the document is destroyed, can be recorded as history information. Also, information representing a user ID of a document destroyer in charge can be recorded as one kind of destruction history information. Consequently, it can be checked later when the document specified by a certain document ID is destroyed, and who destroys the document.

The system can be configured so that when the document creation apparatus 1 creates (or prints) a document, information representing a date and time, at which the document is created, and also representing a user ID of a document creator in charge of the creation of the document, together with the document ID of the document, is registered in the document management table of the document management apparatus 2. Consequently, it can be checked later when the document specified by a certain document ID is created, and who creates the document.

Also, the scanning unit 227 including the insertion sensor 218, the barcode scanner 219, and the stopper gate 220 is detachably mounted on the apparatus body 225 (that is, the upper cover 226) of the document destruction apparatus 3. Thus, the apparatus body 225, from which the scanning unit 227 is removed, can be treated as standard equipment in the configuration of the document destruction apparatus 3. Also, the scanning unit 227 can be mounted on the apparatus body 225 by being treated as a retrofitting option.

Although the QR-code including the document ID is printed on a document by the aforementioned embodiment, the way of providing the document ID according to the invention is not limited thereto. Numerals and symbols representing the document ID may be printed on the document. The method of adding the document ID to the document is not limited to printing. The document ID may be added to the document by sticking a label thereto.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Applications Nos. 2005-297284 and 2005-297285 both filed on Oct. 12, 2005 including specifications, claims, drawings and abstracts are incorporated herein by reference in their entirety.

What is claimed is:

1. A document management system, comprising:
   a document management apparatus that manages a document ID by associating the document ID with a storage time of the document, and that checks the storage time of the document, in response to an inquiry about a permission of destroying the document having a designated document ID, and that gives a permission of destroying the document when the storage time thereof has expired; and
   a document destruction apparatus including a mode selection unit that selects one of a first destruction mode and a second destruction mode and an execution unit that destroys the document according to a destruction mode selected by the mode selection unit;
   the execution unit being configured to destroy the document without reading the document ID thereof in the first destruction mode; and
   in the second destruction mode, the execution unit being configured to read the document ID, to inquire the permission of destroying the document of the document management apparatus by designating the read document ID, and to destroy the document when the document management apparatus gives the permission of destroying the document.

2. The document management system according to claim 1,
   wherein the document destruction apparatus requests an establishment of communication to the document management apparatus with a predetermined timing; and
   the mode selection unit selects one of the destruction modes according to whether the document destruction apparatus succeeds in establishing communication with the document management apparatus.

3. The document management system according to claim 2,
   wherein the mode selection unit selects the first destruction mode when the document destruction apparatus fails to establish communication with the document management apparatus.

4. The document management system according to claim 2,
   wherein the mode selection unit selects the second destruction mode when the document destruction apparatus succeeds in establishing communication with the document management apparatus.

5. The document management system according to claim 2,
   wherein the predetermined timing is a time when the document destruction apparatus is powered on.

6. The document management system according to claim 1,
   wherein the mode selection unit selects one of the destruction modes according to an instruction from a user to switch the destruction mode.

7. A document destruction apparatus, comprising:
   a mode selection unit that selects one of a first destruction mode and a second destruction mode; and
   an execution unit that destroys the document according to a destruction mode selected by the mode selection unit;
   the execution unit being configured to destroy without reading the document ID thereof in the first destruction mode; and
   in the second destruction mode, the execution unit being configured to read the document ID, to inquire a permission of destroying the document of a document management apparatus while designating the read document ID, and to destroy the document when the document management apparatus gives the permission of destroying the document.

* * * * *